(12) United States Patent  (10) Patent No.: US 9,139,462 B2
Kudva  (45) Date of Patent: Sep. 22, 2015

(54) GLASS MANUFACTURING APPARATUS AND METHODS

(71) Applicant: Corning Incorporated, Corning, NY (US)

(72) Inventor: Gautam Narendra Kudva, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 320 days.

(21) Appl. No.: 13/777,665

(22) Filed: Feb. 26, 2013

(65) Prior Publication Data

US 2013/0219964 A1    Aug. 29, 2013

Related U.S. Application Data

(60) Provisional application No. 61/604,783, filed on Feb. 29, 2012.

(51) Int. Cl.
   *C03B 17/06* (2006.01)

(52) U.S. Cl.
   CPC .................................. *C03B 17/068* (2013.01)

(58) Field of Classification Search
   CPC .................................................... C03B 17/068
   USPC .................................. 65/29.1, 29.14, 29.17
   See application file for complete search history.

(56) References Cited

U.S. PATENT DOCUMENTS

| 1,586,618 | A | 6/1926 | Ferngren | |
|---|---|---|---|---|
| 3,419,374 | A | 12/1968 | Offenbacher et al. | |
| 3,773,486 | A | 11/1973 | Toussaint et al. | 65/29 |
| 4,612,030 | A | 9/1986 | Smids | 65/91 |
| 6,616,025 | B1 | 9/2003 | Andrewlavage, Jr. | 225/96.5 |
| 6,758,064 | B1 | 7/2004 | Kariya | 65/91 |
| 7,430,880 | B2 | 10/2008 | Butts et al. | 65/253 |
| 2005/0268655 | A1* | 12/2005 | Butts et al. | 65/29.12 |
| 2006/0042314 | A1 | 3/2006 | Abbott, III et al. | 65/25.3 |
| 2009/0107182 | A1 | 4/2009 | Anderson et al. | 65/90 |
| 2011/0167873 | A1 | 7/2011 | Anderson et al. | 65/91 |
| 2013/0133371 | A1* | 5/2013 | Burdette et al. | 65/91 |

FOREIGN PATENT DOCUMENTS

| JP | 03335291 B2 | 10/2002 |
|---|---|---|
| JP | 2007051028 A | 3/2007 |
| JP | 2012012123 A | 1/2012 |

* cited by examiner

*Primary Examiner* — Matthew Daniels
*Assistant Examiner* — Cynthia Szewczyk
(74) *Attorney, Agent, or Firm* — Matthew J. Mason; Stephen Wentsler

(57) ABSTRACT

A glass manufacturing apparatus includes a control device configured to modify a predetermined diameter of at least one of a first downstream pair of draw rolls in a first downstream equation based on a monitored actual velocity of a first edge portion of a glass ribbon such that a predetermined ribbon velocity of the first edge portion of the glass ribbon in the first downstream equation changes to substantially match the monitored actual velocity without substantially changing a first downstream angular velocity of the at least one of the first downstream pair of draw rolls. In further examples, methods of manufacturing a glass ribbon include the step modifying the predetermined diameter of at least one of a first downstream pair of draw rolls in the first downstream equation based on the monitored actual velocity of the first edge portion of the glass ribbon.

12 Claims, 12 Drawing Sheets

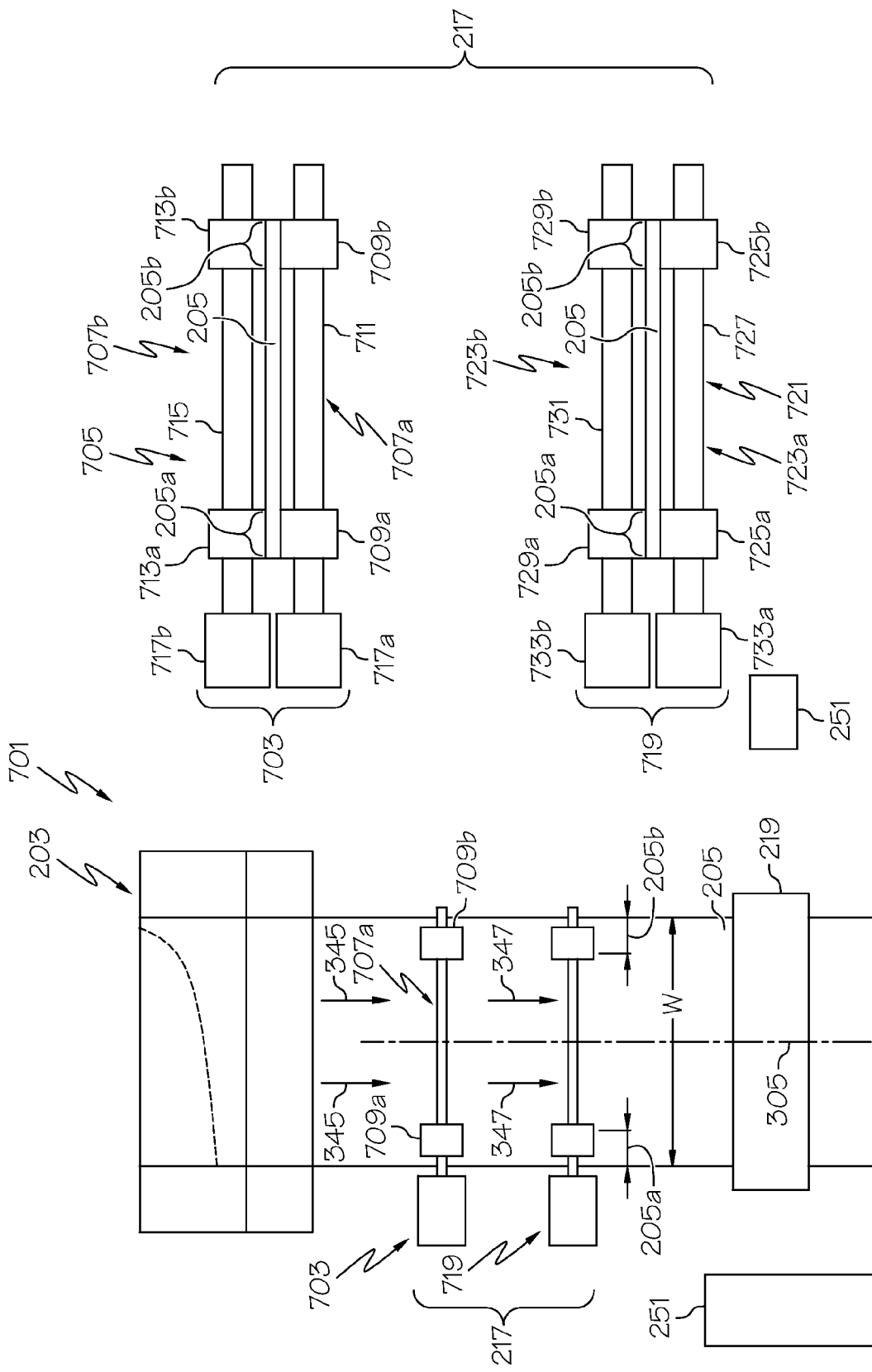

GLASS MANUFACTURING APPARATUS AND METHODS

CROSS-REFERENCE TO RELATED APPLICATIONS

This application claims the benefit of priority under 35 U.S.C. §119 of U.S. Provisional Application Ser. No. 61/604,783 filed on Feb. 29, 2012, the content of which is relied upon and incorporated herein by reference in its entirety.

TECHNICAL FIELD

The present disclosure relates generally to glass manufacturing apparatus and methods and, more particularly, to glass manufacturing apparatus and methods to accommodate for roll wear in the draw rolls of a pull roll apparatus.

BACKGROUND

Glass manufacturing apparatus are known to produce glass sheets, for example, by a fusion down draw process. U.S. Patent Application Publication No. 2009/0107182 that published on Apr. 30, 2009 to Anderson et al. discloses an example glass manufacturing apparatus with a lower pull roll apparatus having a master motor to rotate a lower pair of rolls at a constant angular velocity. The glass manufacturing apparatus further includes an upper pull roll apparatus with upper slave motors configured to rotate an upper pair of rolls at torques that match a predetermined percentage of the measured torque of the master motor of the lower pair of rolls.

The master/slave configuration of the lower/upper pull roll apparatus of the Anderson et al. publication can be beneficial under various process applications. However, perturbations from the glass ribbon growth and sheet formation may propagate to the upper pair of rolls. For example, FIG. 1 illustrates an example graph of a master/slave configuration where the vertical axis is force and the horizontal axis is time. One plot 101 represents the force being applied to the glass ribbon by the lower rolls while the other plot 103 represents the force being applied to the glass ribbon by the upper rolls. As shown, each plot 101, 103 includes a saw-tooth force pattern with a first force pattern 105 representing glass ribbon growth and a second force pattern 107 representing separating of a glass sheet from the glass ribbon.

Moreover, known pull roll apparatus typically include pairs of pull roll members, wherein each pull roll member includes a refractory roll coverings that engage respective first and second edge portions of the glass ribbon to draw the glass ribbon from a root of a forming device. Over time, the refractory roll covering may begin to wear away, thereby changing the actual outer diameter of the refractory roll coverings.

SUMMARY

The following presents a simplified summary of the disclosure in order to provide a basic understanding of some example aspects described in the detailed description.

In one example aspect of the disclosure, a method of manufacturing a glass ribbon comprising the step (I) of providing a first pull roll apparatus including a first upstream pair of draw rolls and a second pull roll apparatus including a first downstream pair of draw rolls positioned downstream along a draw path from the first upstream pair of draw rolls. The method further includes the step (II) of forming a glass ribbon with a width extending between a first edge portion and a second edge portion and the step (III) of operating the first pull roll apparatus such that at least one of the first upstream pair of draw rolls rotates to draw the first edge portion of the glass ribbon along the draw path. The method further includes the step (IV) of calculating a first downstream angular velocity of the at least one of the first downstream pair of draw rolls based on a first downstream equation including a predetermined diameter of the at least one of the first downstream pair of draw rolls and a predetermined ribbon velocity of the first edge portion of the glass ribbon downstream from the second pull roll apparatus. The method still further includes the step (V) of operating the second pull roll apparatus such that the at least one of the first downstream pair of draw rolls rotates at the calculated first downstream angular velocity to further draw the first edge portion of the glass ribbon along the draw path at the predetermined ribbon velocity. The method further includes the step (VI) of monitoring an actual velocity of the first edge portion of the glass ribbon downstream from the second pull roll apparatus. The method also includes the step (VII) of modifying the predetermined diameter in the first downstream equation based on the monitored actual velocity such that the predetermined ribbon velocity in the first downstream equation changes to substantially match the monitored actual velocity of the first edge portion of the glass ribbon downstream from the second pull roll apparatus without substantially changing the first downstream angular velocity.

In one embodiment of the aspect, the method further comprises the step of changing the predetermined ribbon velocity in the first downstream equation to maintain an average thickness of the glass sheet within a desired range of average thicknesses.

In another embodiment of the aspect, the step (VII) includes ramping the predetermined diameter over a period of time such that predetermined ribbon velocity approaches the actual velocity of the first edge portion of the glass ribbon over the period of time.

In still another embodiment of the aspect, the method further includes the steps of: monitoring a first upstream angular velocity of the at least one of the first upstream pair of draw rolls; and modifying a predetermined diameter associated with the at least one of the first upstream pair of draw rolls based on a first upstream equation including the monitored first upstream angular velocity and the actual velocity of the first edge portion monitored during step (VI).

In a further embodiment of the aspect, step (III) includes operating the first pull roll apparatus such that the at least one of the first upstream pair of draw rolls rotates with a substantially constant torque.

In still a further embodiment of the aspect, step (V) includes operating the second pull roll apparatus such that the at least one of the first downstream pair of draw rolls rotates with a substantially constant angular velocity.

In another example aspect, a method of manufacturing a glass ribbon includes the step (I) of providing a first pull roll apparatus including a first upstream pair of draw rolls and a second upstream pair of draw rolls. The method further includes the step (II) of providing a second pull roll apparatus including a first downstream pair of draw rolls positioned downstream along a draw path from the first upstream pair of draw rolls, and a second downstream pair of draw rolls positioned downstream along the draw path from the second upstream pair of draw rolls. The method also includes the step (III) of forming a glass ribbon with a width extending between a first edge portion and a second edge portion. The method further includes the step (IV) of operating the first pull roll apparatus such that at least one of the first upstream pair of draw rolls rotates to draw the first edge portion of the glass ribbon along the draw path and at least one of the second upstream pair of draw rolls rotates to draw the second edge portion of the glass ribbon along the draw path. The method further includes the step (V) of calculating a first downstream angular velocity of at least one of the first downstream pair of draw rolls based on a first downstream equation including a predetermined diameter of the at least one of the first downstream pair of draw rolls and a predetermined ribbon velocity of the first edge portion of the glass ribbon downstream from the second pull roll apparatus. The method also includes the step (VI) of calculating a second downstream angular velocity of at least one of the second downstream pair of draw rolls based on a second downstream equation including a predetermined diameter of the at least one of the second downstream pair of draw rolls and a predetermined ribbon velocity of the second edge portion of the glass ribbon downstream from the second pull roll apparatus. The method further includes the step (VII) of operating the second pull roll apparatus such that the at least one of the first downstream pair of draw rolls rotates at the calculated first downstream angular velocity to further draw the first edge portion of the glass ribbon along the draw path at the predetermined ribbon velocity of the first edge portion, and the at least one of the second downstream pair of draw rolls rotates at the calculated second downstream angular velocity to further draw the second edge portion of the glass ribbon along the draw path at the predetermined ribbon velocity of the second edge portion. The method also includes the step (VIII) of monitoring an actual velocity of the first edge portion of the glass ribbon downstream from the second pull roll apparatus and an actual velocity of the second edge portion of the glass ribbon downstream from the second pull roll apparatus. The method further includes the step (IX) of modifying the predetermined diameter in the first downstream equation based on the monitored actual velocity of the first edge portion such that the predetermined ribbon velocity of the first edge portion in the first downstream equation changes to substantially match the actual velocity of the first edge portion monitored during step (VIII) without substantially changing the first downstream angular velocity. The method also includes the step (X) of modifying the predetermined diameter in the second downstream equation based on the monitored actual velocity of the second edge portion such that the predetermined ribbon velocity of the second edge portion in the second downstream equation changes to substantially match the actual velocity of the second edge portion monitored during step (VIII) without substantially changing the second downstream angular velocity.

In one embodiment of the aspect, the method further comprises the step of changing the predetermined ribbon velocity of the first edge portion in the first downstream equation and/or the step of changing the predetermined ribbon velocity of the second edge portion in the second downstream equation to maintain an average thickness of the glass sheet within a desired range of average thicknesses.

In another embodiment of the aspect, step (IX) and/or step (X) includes ramping the predetermined diameter over a period of time such that the predetermined ribbon velocity of the corresponding edge portion approaches the monitored actual velocity of the corresponding edge portion over the period of time.

In still another embodiment of the aspect, the method further comprises the steps of: monitoring a first upstream angular velocity of the at least one of the first upstream pair of draw rolls and monitoring a second upstream angular velocity of the at least one of the second upstream pair of draw rolls; modifying a predetermined diameter associated with the at least one of the first upstream pair of draw rolls based on a first upstream equation including the monitored first upstream angular velocity and the actual velocity of the first edge portion monitored during step (VIII); and modifying a predetermined diameter associated with the at least one of the second upstream pair of draw rolls based on a second upstream equation including the monitored second upstream angular velocity and the actual velocity of the second edge portion monitored during step (VIII).

In yet another embodiment of the aspect, step (IV) includes operating the first pull roll apparatus such that the at least one of the first upstream pair of draw rolls and the at least one of the second upstream pair of draw rolls each rotate with a substantially constant torque.

In a further embodiment of the aspect, step (VII) includes operating the second pull roll apparatus such that the at least one of the first downstream pair of draw rolls and the at least one of the second downstream pair of draw rolls each rotate with a substantially constant angular velocity.

In still another aspect, a glass manufacturing apparatus includes a forming device configured to produce a glass ribbon including a width extending between a first edge portion and a second edge portion. The glass manufacturing apparatus further includes a first pull roll apparatus including a first upstream pair of draw rolls configured to draw the first edge portion of the glass ribbon from the forming device along a draw path extending transverse to the width of the glass ribbon. The glass manufacturing apparatus still further includes a second pull roll apparatus including at least a first downstream roll drive device and a first downstream pair of draw rolls. The first downstream pair of draw rolls are positioned downstream along the draw path from the first upstream pair of draw rolls. The first downstream roll drive device is configured to rotate at least one of the first downstream pair of draw rolls to further draw the first edge portion of the glass ribbon along the draw path. The glass manufacturing apparatus further includes a control device configured to calculate a first downstream angular velocity of the at least one of the first downstream pair of draw rolls based on a first downstream equation including a predetermined diameter of the at least one of the first downstream pair of draw rolls and a predetermined ribbon velocity of the first edge portion of the glass ribbon downstream from the second pull roll apparatus. The control device is further configured to operate the first downstream roll drive device such that the at least one of the first downstream pair of draw rolls rotates at the calculated first downstream angular velocity to further draw the first edge portion of the glass ribbon along the draw path at the predetermined ribbon velocity. The glass manufacturing apparatus further includes a feedback device configured to provide the control device with a monitored actual velocity of the first edge portion of the glass ribbon downstream from the second pull roll apparatus. The control device is further configured to modify the predetermined diameter in the first downstream equation based on the monitored actual velocity such that the predetermined ribbon velocity in the first downstream equation changes to substantially match the monitored actual velocity without substantially changing the first downstream angular velocity.

In one example of the aspect, the glass manufacturing apparatus further comprises a thickness control device configured to change the predetermined ribbon velocity in the first downstream equation to maintain an average thickness of the glass sheet within a desired range of average thicknesses.

In another example of the aspect, the control device is configured to ramp the predetermined diameter over a period of time such that predetermined ribbon velocity approaches the actual velocity of the first edge portion of the glass ribbon over the period of time.

In yet another example of the aspect, the control device is configured to receive a monitored first upstream angular velocity of at least one of the first upstream pair of draw rolls, and modify a predetermined diameter associated with the at least one of the first upstream pair of draw rolls based on a first upstream equation including the monitored first upstream angular velocity and the monitored actual velocity.

In a further example of the aspect, the control device is configured to operate the first pull roll apparatus such that the at least one of the first upstream pair of draw rolls rotates with a substantially constant torque.

In another example of the aspect, the control device is configured to operate the second pull roll apparatus such that the at least one of the first downstream pair of draw rolls rotates with a substantially constant angular velocity.

In a further example of the aspect, the first pull roll apparatus includes a second upstream pair of draw rolls configured to draw the second edge portion of the glass ribbon from the forming device along the draw path; the second pull roll apparatus includes a second downstream roll drive device and a second downstream pair of draw rolls, wherein the second downstream pair of draw rolls are positioned downstream along the draw path from the second upstream pair of draw rolls, wherein the second downstream roll drive device is configured to rotate at least one of the second downstream pair of draw rolls to further draw the second edge portion of the glass ribbon along the draw path; the control device is further configured to calculate a second downstream angular velocity of the at least one of the second downstream pair of draw rolls based on a second downstream equation including a predetermined diameter of the at least one of the second downstream pair of draw rolls and a predetermined ribbon velocity of the second edge portion of the glass ribbon downstream from the second pull roll apparatus, wherein the control device is further configured to operate the second downstream roll drive device such that the at least one of the second downstream pair of draw rolls rotates at the calculated second downstream angular velocity to further draw the second edge portion of the glass ribbon along the draw path at the predetermined ribbon velocity; and the control device is further configured to modify the predetermined diameter of the at least one of the second downstream pair of draw rolls in the second downstream equation based on the monitored actual velocity of the second edge portion of the glass ribbon such that the predetermined ribbon velocity of the second edge portion in the second downstream equation changes to substantially match the monitored actual velocity of the second edge portion of the glass ribbon without substantially changing the second downstream angular velocity.

In another example of the aspect, the glass manufacturing apparatus further comprises a thickness control device configured to change the predetermined ribbon velocities of the first and second edge portions of the ribbon in the corresponding first and second downstream equations to maintain an average thickness of the glass sheet within a desired range of average thicknesses.

In still another example of the aspect, the control device is configured to ramp the predetermined diameters of the at least one of the first and second downstream pairs of draw rolls over a period of time such that predetermined ribbon velocities each approach the actual velocity of the first and second edge portions of the glass ribbon over the period of time.

In yet another example of the aspect, the control device is configured to receive a monitored first upstream angular velocity of at least one of the first upstream pair of draw rolls and a monitored second upstream angular velocity of at least one of the second upstream pair of draw rolls, and modify a predetermined diameter associated with each of the at least one of the first and second upstream pair of draw rolls based on respective first and second upstream equations including the monitored first and second upstream angular velocities and the monitored actual velocities of the first and second edge portions of the glass ribbon.

In yet another example of the aspect, the control device is configured to operate the first pull roll apparatus such that the at least one of the first and second upstream pair of draw rolls each rotate with a substantially constant torque.

In another example of the aspect, the control device is configured to operate the second pull roll apparatus such that the at least one of the first and second downstream pair of draw rolls each rotate with a substantially constant angular velocity.

BRIEF DESCRIPTION OF THE DRAWINGS

These and other aspects are better understood when the following detailed description is read with reference to the accompanying drawings, in which:

FIG. 7 is a front view of another pull roll device in accordance with aspects of the disclosure;

FIG. 8 are top views of the first pull roll apparatus and the second pull roll apparatus of FIG. 7;

DETAILED DESCRIPTION

Figure 1:
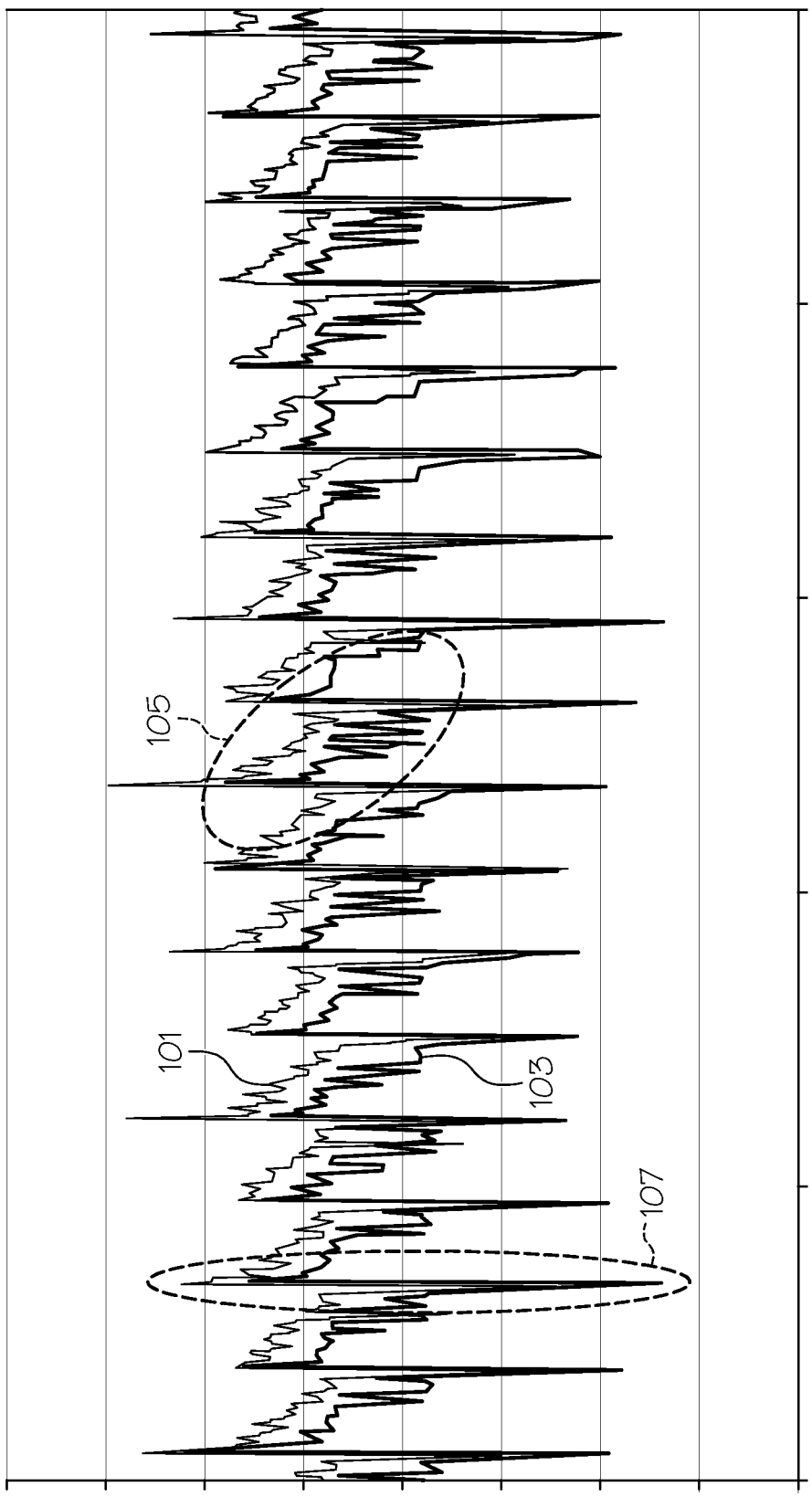
FIG. 1 illustrates an example graph of a master/slave configuration.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Figure 2:
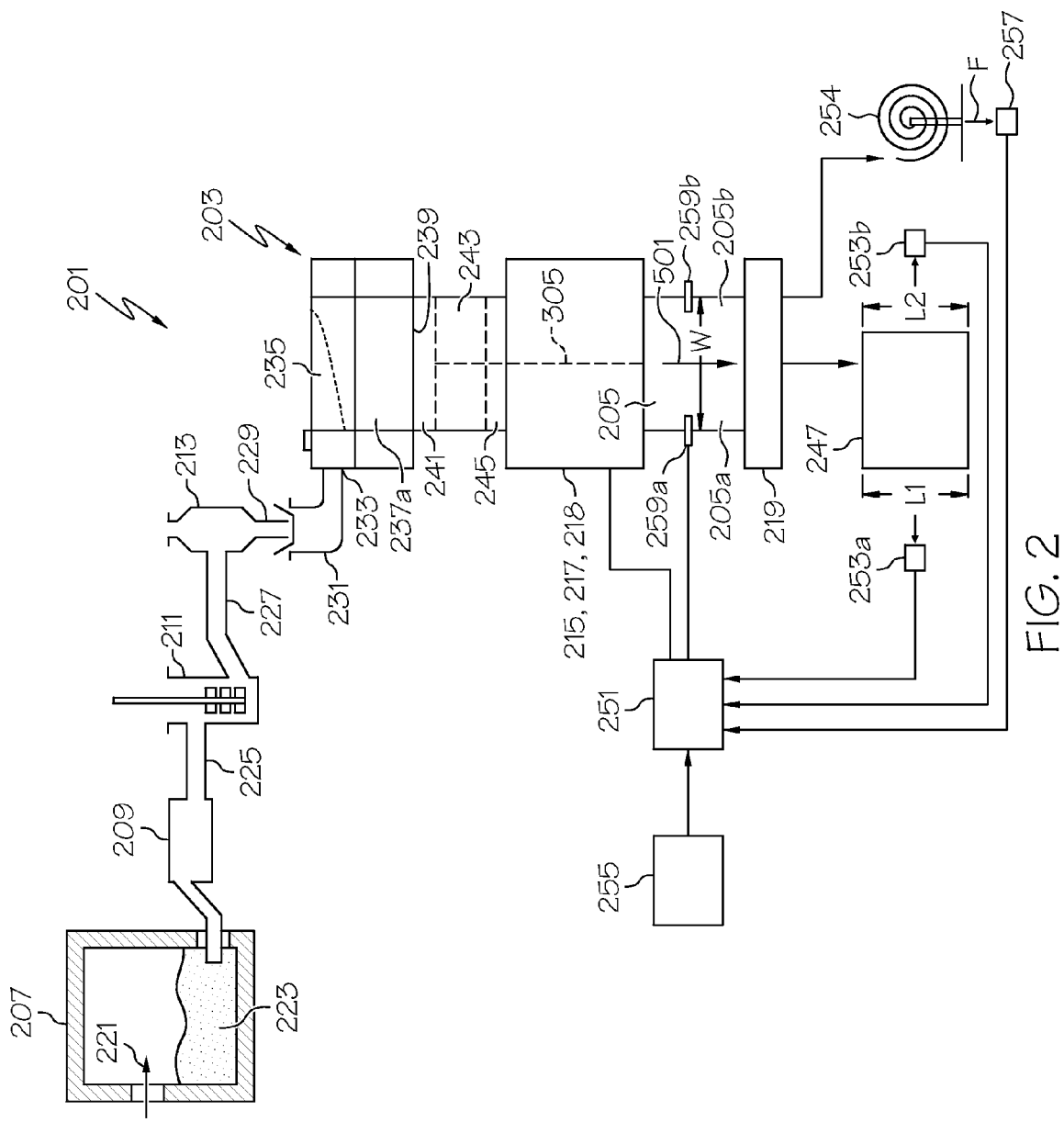
FIG. 2 is a glass manufacturing apparatus in accordance with examples of the disclosure.

Referring now to FIG. 2, there is shown a schematic view of an exemplary glass manufacturing apparatus 201 that may be used in accordance with aspects of the disclosure. The exemplary glass manufacturing apparatus 201 is illustrated as a down draw fusion apparatus although other forming apparatus may be used in further examples. In one example, the glass manufacturing apparatus 201 can include a forming device 203 to produce a glass ribbon 205 including a width "W" extending between a first edge portion 205a and a second edge portion 205b of the glass ribbon 205.

As further illustrated in FIG. 2, the glass manufacturing apparatus 201 can include a melting vessel 207, a fining vessel 209, a mixing vessel 211, a delivery vessel 213, the forming device 203, a pull roll device 215, 217, 218 and a separating device 219.

The melting vessel 207 is where the glass batch materials are introduced as shown by arrow 221 and melted to form molten glass 223. The fining vessel 209 has a high temperature processing area that receives the molten glass 223 (not shown at this point) from the melting vessel 207 and in which bubbles are removed from the molten glass 223. The fining vessel 209 is connected to the mixing vessel 211 by a finer to stir chamber connecting tube 225. The mixing vessel 211 is connected to the delivery vessel 213 by a stir chamber to bowl connecting tube 227. The delivery vessel 213 delivers the molten glass 223 through a downcomer 229 to an inlet 231 and into the forming device 203.

Figure 3:
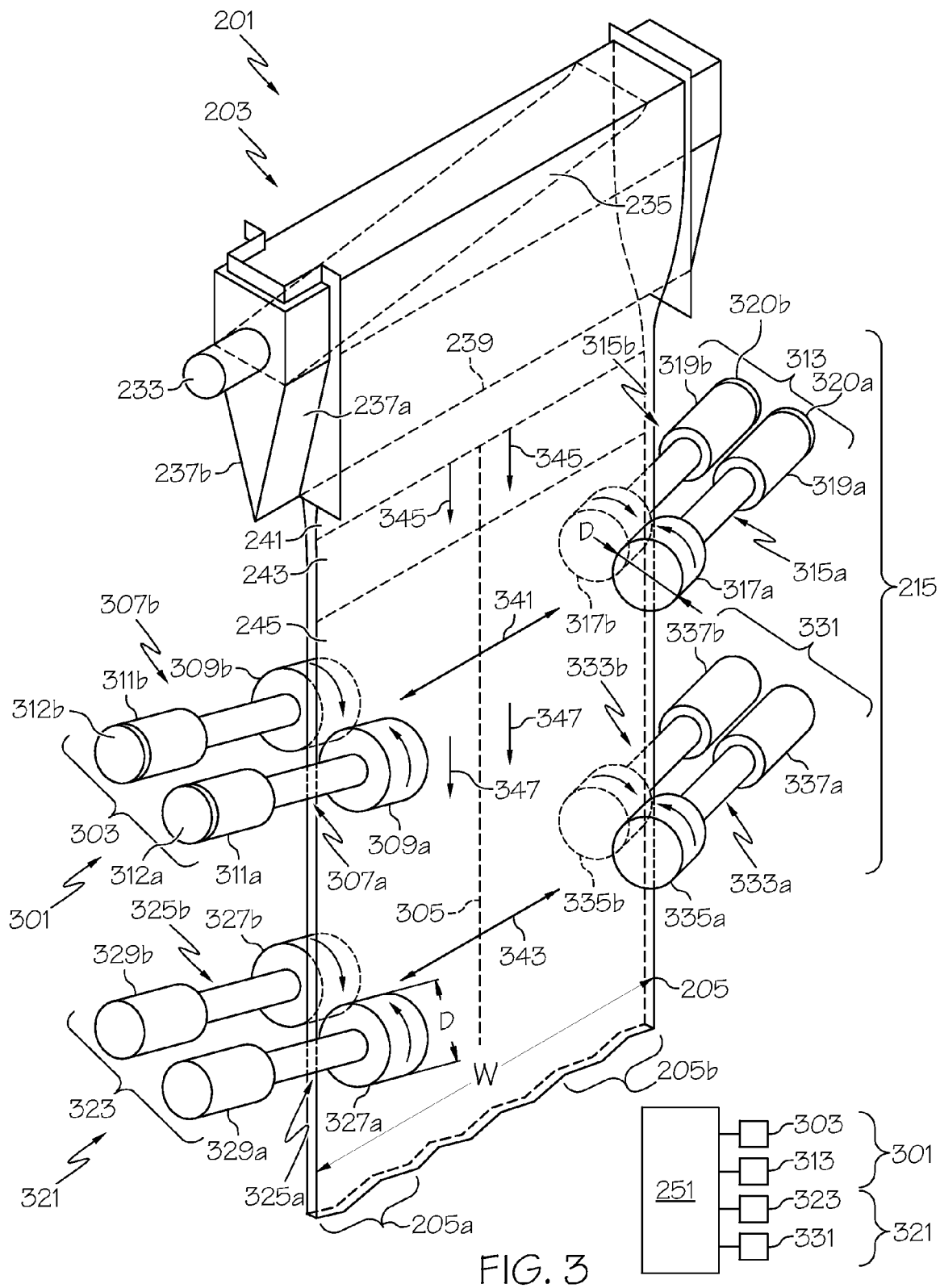
FIG. 3 is a perspective view of portions of the glass manufacturing apparatus of FIG. 2 with a first example pull roll device in accordance with aspects of the disclosure.

Various forming devices may be used in accordance with aspects of the disclosure. For example, as shown in FIGS. 2 and 3, the forming device 203 includes an opening 233 that receives the molten glass 223 which flows into a trough 235. As best shown in FIG. 3 the molten glass 223 from the trough 235 then overflows and runs down two sides 237a and 237b before fusing together at a root 239 of the forming device 203. The root 239 is where the two sides 237a, 237b come together and where the two overflow walls of molten glass 223 flowing over each of the two sides 237a, 237b fuse together as the glass ribbon 205 drawn downward off the root 239.

A portion of the glass ribbon 205 is drawn off the root 239 into a viscous zone 241 wherein the glass ribbon 205 begins thinning to a final thickness. The portion of the glass ribbon 205 is then drawn from the viscous zone 241 into a setting zone 243. In the setting zone 243, the portion of the glass ribbon 205 is set from a viscous state to an elastic state with the desired profile. The portion of the glass ribbon 205 is then drawn from the setting zone 243 to an elastic zone 245. Once in the elastic zone 245, the glass ribbon 205 may be deformed, within limits, without permanently changing the profile of the glass ribbon 205.

Turning back to FIG. 2, after the portion of the glass ribbon 205 enters the elastic zone 245, a separating device 219 may be provided to sequentially separate a plurality of glass sheets 247 from the glass ribbon 205 over a period of time. The separating device 219 may comprise the illustrated traveling anvil machine although further separating devices may be provided in further examples.

The glass manufacturing apparatus 201 further includes a pull roll device 215, 217, 218 schematically illustrated in FIG. 2. As discussed more fully below, the pull roll devices 215, 217, 218 may be provided to help draw the glass ribbon 205 from the root 239 and may isolate transmission of forces up the glass ribbon 205 from the elastic zone 245 to the setting zone 243. As such, the pull roll devices of the present disclosure can draw the glass ribbon to the desired thickness while also reducing residual stress within the glass sheet. As shown, the pull roll device 215, 217, 218 can be located entirely within the elastic zone 245. Indeed, as illustrated in the drawings, all of the pull roll apparatus are located within the elastic zone 245. In further examples, a portion of at least one of the pull roll apparatus may be located in the setting zone 243. For example, the first pull roll apparatus may be located in the setting zone 243 while remaining (e.g., second, third, etc.) pull roll apparatus is/are located in the elastic zone 245. In still further examples, the pull roll device 215, 217, 218 may be located entirely within the setting zone 243. For example, all of the pull roll apparatus (i.e., first, second, third, etc.) can both be located within the setting zone 243.

As further shown schematically in FIG. 2, the glass manufacturing apparatus 201 can further include a feedback device configured to provide a control device 251 (e.g., programmable logic controller) with a monitored actual velocity of the first edge portion 205a and/or the second edge portion 205b of the glass ribbon 205 downstream from the downstream pull roll apparatus. In one example, the feedback device can include at least one sensing device 253a, 253b configured to sense a length of a portion of a glass sheet 247 over a period of time. In another example, the feedback device can include a plurality of sensing devices such as the illustrated first sensing device 253a and the second sensing device 253b. The first sensing device 253a can be configured to measure a first length L1 of the first edge portion 205a of the glass sheet 247 over a period of time. Likewise, the second sensing device 253b can be configured to measure a second length L2 of the second edge portion 205b of the glass sheet 247 over a period of time. The sensed signals associated with the lengths L1 and/or L2 can then be sent by the first and/or second sensing device 253a, 253b to the control device 251. The control device 251 can then be configured to calculate an actual velocity of the first edge portion 205a and/or the second edge portion 205b based on the corresponding measured lengths and the time period for producing a length of the glass sheet 247.

The feedback device comprising first and/or second sensing devices 253a, 253b can comprise automatic sensing devices in that human interaction may be limited or completely eliminated during one or more sensing procedures. In further examples, the feedback device can comprise a manual feedback device 255. For instance, an operator may measure the first edge portion 205a and/or the second edge portion 205b of one of the glass sheets periodically, or may even measure the edge portions of many sheets sequentially. The operator can then enter the length(s) for each of the glass sheets and the corresponding time to produce each respective glass sheet into a manual feedback device 255 such as a user interface. The manual feedback device 255 can then provide the control device 251 with the manually measured information to calculate the actual velocity of the first edge portion 205a and/or the second edge portion 205b.

In some examples, the sensing devices 253a, 253b can be configured to measure the length of each subsequent glass sheet 247 or periodically measure a smaller number of the glass sheets over a period of time. Likewise, an operator may measure every glass sheet over produced or measure a smaller number of the glass sheets as a representative sample of all of the glass sheets. The operator can then enter the information periodically into the manual feedback device 255. In another example, a sheet height gauge device can be provided to measure the height of the sheet by way of a set of cameras. Information from the cameras can then be sent to the control device as the PLC timer and the CCD cameras are accurate and the digital outputs enable an auto correction.

Other feedback devices may be used in order to provide information to calculate actual ribbon velocity. For example, rather than the sensing devices 253a, 253b, the feedback device may comprise a force sensor 257, such as a scale, configured to measure changes in the weight (see "F" in FIG. 2) of a coiled storage roll 259 of glass ribbon 205. Such a configuration may be desirable, for instance, if the separating device 219 is deactivated so that the glass ribbon 205 is coiled as a continuous ribbon onto the storage roll for subsequent processing at a later time. The control device 251 can be configured to calculate the actual velocity of the glass ribbon 205 based on the rate of weight change of the coiled storage roll 259 together with other parameters associated with the glass ribbon (e.g., ribbon thickness, width, density, etc.). As described more fully below, the control device 251 can use information from the feedback device to facilitate operation of the pull roll devices 215, 217, 218.

FIG. 3 illustrates a first example of the pull roll device 215 in accordance with one example of the disclosure although other pull roll device constructions may be provided in further examples. As shown in FIG. 3, the pull roll device 215 can include a first pull roll apparatus 301 including a first upstream pair of draw rolls 303 configured to draw the first edge portion 205a of the glass ribbon 205 from the forming device 203 along a draw path 305 extending transverse to the width "W" of the glass ribbon 205.

As shown, the first upstream pair of draw rolls 303 can include a first pull roll member 307a and a second pull roll member 307b. The first and second pull roll members 307a, 307b can each be provided with a respective refractory roll covering 309a, 309b configured to engage the first edge portion 205a of the glass ribbon 205 therebetween. At least one of the first and second pull roll members 307a, 307b may be provided with a first upstream roll drive device configured to rotate at least one of the first upstream pair of draw rolls 303 such that the at least one of the first upstream pair of draw rolls 303 rotates to draw the first edge portion 205a of the glass ribbon 205 along the draw path 305. As shown, the first upstream roll drive device can include at least one or both of respective motors 311a, 311b. For example, as shown, both the first and second pull roll members 307a, 307b are provided with a respective motor 311a, 311b. In further examples, only one of the first and second pull roll members 307a, 307b is provided with a motor wherein the other pull roll member may be provided with a bearing such that only one of the first and second pull roll members 307a, 307b is driven.

As further illustrated, a monitoring device may be associated with the first and/or second pull roll members 307a, 307b to monitor the angular velocity of the respective pull roll member. For example, as shown in FIG. 3, each of the first and second motors 311a, 311b may be provided with a corresponding first and second monitoring device 312a, 312b. The monitoring devices, if provided, can provide feedback of the monitored angular velocity of one or both of the first and/or second pull roll members 307a, 307b to the control device 251.

In another example, in addition or in alternative to the first upstream pair of draw rolls 303, the first pull roll apparatus 301 can include a second upstream pair of draw rolls 313 configured to draw the second edge portion 205b of the glass ribbon 205 from the forming device 203 along the draw path 305. As shown, the second upstream pair of draw rolls 313 can include a first pull roll member 315a and a second pull roll member 315b. The first and second pull roll members 315a, 315b can each be provided with a respective refractory roll covering 317a, 317b configured to engage the second edge portion 205b of the glass ribbon 205 therebetween. At least one of the first and second pull roll members 315a, 315b may be provided with a second upstream roll drive device configured to rotate at least one of the second upstream pair of draw rolls 313 such that the at least one of the second upstream pair of draw rolls 313 rotates to draw the second edge portion 205b of the glass ribbon 205 along the draw path 305. As shown, the second upstream roll drive device can include at least one or both of respective motors 319a, 319b. For example, as shown, both the first and second pull roll members 315a, 315b are provided with a respective motor 319a, 319b. In further examples, only one of the first and second pull roll members 315a, 315b is provided with a motor wherein the other pull roll member may be provided with a bearing such that only one of the first and second pull roll members 315a, 315b is driven.

As further illustrated, a monitoring device may be associated with the first and/or second pull roll members 315a, 315b to monitor the angular velocity of the respective pull roll member. For example, as shown in FIG. 3, each of the first and second motors 319a, 319b may be provided with a corresponding first and second monitoring device 320a, 320b. The optional monitoring devices can provide feedback of the monitored angular velocity of one or both of the first and/or second pull roll members 315a, 315b to the control device 251.

In some examples, the control device 251 can be configured to receive signals from the monitored first upstream angular velocity of at least one of the first upstream pair of draw rolls 303 and a monitored second upstream angular velocity of at least one of the second upstream pair of draw rolls 313. The control device 251 can then optionally modify a predetermined diameter associated with each of the at least one of the first and second upstream pair of draw rolls 303, 313 based on respective first and second upstream equations including the monitored first and second upstream angular velocities and the monitored actual velocities of the first and second edge portions of the glass ribbon by way of the feedback device (e.g., feedback devices 253a, 253b, 255, 257). For example, as shown in FIG. 3, "D" can be the diameter associated with each refractory roll covering 309a, 309b, 317a, 317b that may be different from one another based on different wear characteristics associated with each refractory roll covering. The first and second upstream equations used by the control device 251 can comprise the following equation (1):

$$D = 2(V/\omega) \quad (1)$$

Where D is the diameter of the refractory roll covering of the respective pull roll member, V is the actual velocity of the respective edge portion, and ω is the angular velocity of the respective pull roll member.

As such, the control device can track the actual diameter of the refractory roll covering 309a, 309b based on the actual velocity of the first edge portion 205a obtained by the feedback device (e.g., 253a, 255, 257) and the angular velocity monitored by the monitoring device 312a, 312b. Likewise, the control device can track the actual diameter of the refractory roll covering 317a, 317b based on the actual velocity of the second edge portion 205b obtained by the feedback device (e.g., 253b, 255, 257) and the angular velocity monitored by the monitoring device 320a, 320b. Tracking the actual diameter can be helpful in the event that the first pull roll apparatus 301 is changed to operate under constant velocity rather than constant torque. For example, if a glass ribbon fails at some downstream location (e.g., by a crack through the width "W" of the glass ribbon 205), the glass manufacturing apparatus 201 may automatically switch the first pull roll apparatus 301 from operating at a constant torque to operating at a constant velocity. As such, force disturbances may be inhibited, such as prevented from traveling up through the ribbon into the setting and viscous zones of the glass ribbon 205; thereby avoiding significant processing time to achieve equilibrium conditions to again begin producing high quality glass ribbon.

Moreover, since the correct diameter is tracked, the first pull roll apparatus 301 will be able to operate under the correct velocity given that the diameter of the refractory roll coverings may have changed during roll wear. Once sufficient glass ribbon is drawn, the second, third, etc. pull roll apparatus may be properly engaged with the ribbon. Thereafter, the first pull roll apparatus 301 can then be switched back to operating under substantially constant torque.

The pull roll device 215 further includes a second pull roll apparatus 321 including a first downstream pair of draw rolls 323 positioned downstream along the draw path 305 from the first upstream pair of draw rolls 303, wherein the first downstream pair of draw rolls 323 are configured to further draw the first edge portion 205a of the glass ribbon 205 along the draw path 305. As shown, the first downstream pair of draw rolls 323 can include a first pull roll member 325a and a second pull roll member 325b. The first and second pull roll members 325a, 325b can each be provided with a respective refractory roll covering 327a, 327b configured to engage the first edge portion 205a of the glass ribbon 205 therebetween.

At least one of the first and second pull roll members 325a, 325b may be provided with a first downstream roll drive device configured to rotate at least one of the first downstream pair of draw rolls 323 such that the at least one of the first downstream pair of draw rolls 323 rotates to further draw the first edge portion 205a of the glass ribbon 205 along the draw path 305. As shown, the first downstream roll drive device can include at least one or both of respective motors 329a, 329b. For example, as shown, both the first and second pull roll members 325a, 325b are provided with a respective motor 329a, 329b. In further examples, only one of the first and second pull roll members 325a, 325b is provided with a motor wherein the other pull roll member may be provided with a bearing such that only one of the first and second pull roll members 325a, 325b is driven.

In another example, in addition or in alternative to the first downstream pair of draw rolls 323, the second pull roll apparatus 321 can include a second downstream pair of draw rolls 331 positioned downstream along the draw path 305 from the second upstream pair of draw rolls 313, wherein the second downstream pair of draw rolls 331 are configured to further draw the second edge portion 205b of the glass ribbon 205 along the draw path 305. As shown, the second downstream pair of draw rolls 331 can include a first pull roll member 333a and a second pull roll member 333b. The first and second pull roll members 333a, 333b can each be provided with a respective refractory roll covering 335a, 335b configured to engage the second edge portion 205b of the glass ribbon 205 therebetween.

At least one of the first and second pull roll members 333a, 333b may be provided with a second downstream roll drive device configured to rotate at least one of the second downstream pair of draw rolls 331 such that the at least one of the second downstream pair of draw rolls 331 rotates to further draw the second edge portion 205b of the glass ribbon 205 along the draw path 305. As shown, the second downstream roll drive device can include at least one or both of respective motors 337a, 337b. For example, as shown, both the first and second pull roll members 333a, 333b are provided with a respective motor 337a, 337b. In further examples, only one of the first and second pull roll members 333a, 333b is provided with a motor wherein the other pull roll member may be provided with a bearing such that only one of the first and second pull roll members 333a, 333b is driven.

In a further example, the control device 251 can be configured to calculate the first downstream angular velocity of at least one of the first downstream pair of draw rolls 323 based on a first downstream equation including a predetermined diameter of the at least one of the first downstream pair of draw rolls 323 and a predetermined ribbon velocity of the first edge portion 205a of the glass ribbon 205 from the second pull roll apparatus 321.

Likewise, in a further example, the control device 251 can be configured to calculate the first downstream angular velocity of at least one of the second downstream pair of draw rolls 331 based on a second downstream equation including a predetermined diameter of the at least one of the second downstream pair of draw rolls 331 and a predetermined ribbon velocity of the second edge portion 205b of the glass ribbon 205 from the second pull roll apparatus 321.

For example, as shown in FIG. 3, "D" can also be considered the predetermined diameter associated with each refractory roll covering 327a, 327b, 335a, 335b that may be different from one another based on different wear characteristics associated with each refractory roll covering. The first and second downstream equations used by the control device 251 can comprise the following equation (2):

$$\omega = 2(V/D) \qquad (2)$$

Where D is the predetermined diameter of the refractory roll covering of the respective pull roll member, V is the predetermined ribbon velocity of the respective edge portion, and $\omega$ is the angular velocity of the respective pull roll member.

As such, the control device can calculate the first downstream angular velocity of at least one of the first downstream pair of draw rolls 323 based on the predetermined diameter of the refractory roll covering 327a, 327b and the predetermined velocity of the first edge portion 205a. Likewise, the control device can calculate the second downstream angular velocity of at least one of the second downstream pair of draw rolls 331 based on the predetermined diameter of the refractory roll covering 335a, 335b and the predetermined velocity of the second edge portion 205b. The predetermined diameters, in this instance, can be the approximate actual measured or assumed diameters of the refractory roll coverings.

Once the control device calculates the first downstream angular velocity, the control device 251 is further configured to operate the first downstream roll drive device, such as one or both of motors 329a, 329b to rotate at the calculated first downstream angular velocity to further draw the first edge portion 205a of the glass ribbon 205 along the draw path 305 at the predetermined ribbon velocity of the first edge portion 205a of the glass ribbon 205. Likewise, once the control device calculates the second downstream angular velocity, the control device 251 is further configured to operate the second downstream roll drive device, such as one or both of motors 337a, 337b to rotate at the calculated second downstream angular velocity to further draw the second edge portion 205b of the glass ribbon 205 along the draw path 305 at the predetermined ribbon velocity of the second edge portion 205b of the glass ribbon 205.

The control device 251 can also be configured to modify the predetermined diameter in the first downstream equation (see equation (2) above) based on the monitored actual velocity such that the predetermined ribbon velocity in the first downstream equation changes to substantially match the monitored actual velocity without substantially changing the first downstream angular velocity. For example, the control device 251 can be configured to modify the predetermined diameter of at least one of the refractory roll coverings 327a, 327b in the first downstream equation (see equation (2) above) based on the monitored actual velocity of the first edge portion 205a of the first ribbon 205 such that the predetermined ribbon velocity of the first edge portion 205a in the first downstream equation changes to substantially match the monitored actual velocity of the first edge portion without substantially changing the first downstream angular velocity associated with the respective first and second pull roll member 325a, 325b of the first downstream pair of draw rolls 323. Likewise, the control device 251 can be configured to modify the predetermined diameter of at least one of the refractory roll coverings 335a, 335b in the second downstream equation (see equation (2) above) based on the monitored actual velocity of the second edge portion 205b of the first ribbon 205 such that the predetermined ribbon velocity of the second edge portion 205b in the second downstream equation changes to substantially match the monitored actual velocity of the second edge portion without substantially changing the second downstream angular velocity associated with the respective first and second pull roll member 333a, 333b of the second downstream pair of draw rolls 331.

Changing the diameter in such a manner can help accommodate changes in the diameter of the refractory roll coverings 327a, 327b, 335a, 335b from creating unintended changes in the speed of the glass ribbon 205 downstream from the second pull roll apparatus 321. As such, speed mismatches between the glass ribbon and the separating device 219 is minimized, such as prevented; thereby preventing force disturbances due to speed mismatches from propagating up through the ribbon to the viscous zone and/or the setting zone. Indeed, speed mismatches between the second pull roll apparatus 321 and the separating device 219 may cause slippage of the glass ribbon through one or both of the first and/or second downstream pair of draw rolls 323, 331. Therefore, wear of the refractory roll coverings 327a, 327b, 335a, 335b may be accounted for by modifying the predetermined diameter associated with the refractory roll coverings as discussed above. As such, potential force disturbances that may otherwise be generated by the speed mismatch can be minimized, such as avoided.

When modifying the predetermined diameter in the first and second downstream equation discussed above, the control device 251 can optionally be configured to ramp the predetermined diameter of the refractory roll coverings 327a, 327b, 335a, 335b over a period of time such that corresponding predetermined ribbon velocity approaches the actual velocity of the corresponding edge portions of the glass ribbon over the period of time. As such, the control device 251 can smooth out the correction of the predetermined diameter over a period of time to avoid issues that may be associated with abrupt stepping of the predetermined diameter over a relatively short period of time.

The glass manufacturing apparatus 201 can further include a thickness control device configured to change the predetermined ribbon velocity in the first and/or second downstream equation to maintain an average thickness of the glass sheet within a desired range of average thicknesses. For example, as shown in FIG. 2, the glass manufacturing apparatus can further include a first edge thickness sensor 259a associated with the first edge portion 205a of the glass ribbon 205. Likewise, the glass manufacturing apparatus can further include a second edge thickness sensor 259b associated with the second edge portion 205b of the glass ribbon 205.

The control device 251 can receive thickness signals from the first and/or second edge thickness sensors 259a, 259b. Based on the received signals, the control device 251 can change the predetermined ribbon velocity "V" in the first and/or second downstream equation (see equation (2) above) which modifies the angular velocity ω in equation (2) above. For example, the control device 251 can receive a thickness signal from the first edge thickness sensor 259a indicating the thickness of the first edge portion 205a of the glass ribbon. If the actual measured thickness needs correction, the control device 251 can change the predetermined ribbon velocity associated with the first edge portion 205a in the second downstream equation to modify the angular velocity used to control the motors 329a, 329b to correct the thickness of the first edge portion 205a of the glass ribbon 205. Likewise, the control device 251 can receive a thickness signal from the second edge thickness sensor 259b indicating the thickness of the second edge portion 205b of the glass ribbon. If the actual measured thickness needs correction, the control device 251 can change the predetermined ribbon velocity associated with the second edge portion 205b in the second downstream equation to modify the angular velocity used to control the motors 337a, 337b to correct the thickness of the first edge portion 205a of the glass ribbon 205.

The control device 251 is further configured to independently operate the first pull roll apparatus 301 and the second pull roll apparatus 321 such that at least one of the first upstream pair of draw rolls 303 rotates with a substantially constant torque and at least one of the first downstream pair of draw rolls 323 rotates with a substantially constant angular velocity. Independent operation of the first and second pull roll apparatus, for purposes of this disclosure, means that one of the first and second pull roll apparatus may be operated without being affected by operation of the other of the first and second pull roll apparatus. As such, for example, independently operating the first pull roll apparatus 301 with the control device provides for the control device to operate the first pull roll apparatus 301 without considering changes in operating parameters of the second pull roll apparatus 321.

As mentioned previously, the first upstream pair of draw rolls 303 can include a single motor associated with one of the first or second pull roll members 307a, 307b. In such an example, the control device 251 can operate the single motor such that the associated first or second pull roll members 307a, 307b is rotated with a substantially constant torque. As further described above, each of the first and second pull roll members 307a, 307b may be provided with a corresponding motor 311a, 311b. In such examples, the control device 251 may operate the motors 311a, 311b such that at least one, such as both, of the first upstream pair of draw rolls 303 rotate with a substantially constant torque. Rotating both pull roll members 307a, 307b of the first upstream pair of draw rolls 303 with a substantially constant torque may be desirable to apply force equally at both sides of the first edge portion 205a of the glass ribbon 205.

As mentioned previously, first pull roll apparatus 301 may also include an optional second upstream pair of draw rolls 313. In such examples, the second upstream pair of draw rolls 313 can include a single motor associated with one of the first or second pull roll members 315a, 315b. In such an example, the control device 251 can operate the single motor such that the associated first or second pull roll members 315a, 315b is rotated with a substantially constant torque. As further described above, each of the first and second pull roll members 315a, 315b may be provided with a corresponding motor 319a, 319b. In such examples, the control device 251 may operate the motors 319a, 319b such that at least one, such as both, of the second upstream pair of draw rolls 313 rotate with a substantially constant torque. Rotating both pull roll members 315a, 315b of the second upstream pair of draw rolls 313 with a substantially constant torque may be desirable to apply force equally at both sides of the second edge portion 205b of the glass ribbon 205.

Although not required, in some examples, the control device 251 can operate one or both of the motors associated with the first upstream pair of draw rolls 303 with a substantially constant first torque and can simultaneously operate one or both of the motors associated with the second upstream pair of draw rolls 313 to rotate with a substantially constant second torque that is substantially equal to the first torque. Providing substantially equal first and second torques can be desired, for example, to apply substantially the same force to the glass ribbon 205 and the first and second edge portions 205a, 205b.

As mentioned previously, first downstream pair of draw rolls 323 can include a single motor associated with one of the first or second pull roll members 325a, 325b. In such an example, the control device 251 can operate the single motor such that the associated first or second pull roll members 325a, 325b rotates with a substantially constant angular velocity. As further described above, each of the first and second pull roll members 325a, 325b may be provided with a corresponding motor 329a, 329b. In such examples, the control device 251 may operate the motors 329a, 329b such that at least one, such as both, of the first downstream pair of draw rolls 323 rotate with a substantially constant angular velocity. Rotating both pull roll members 325a, 325b of the first downstream pair of draw rolls 323 with a substantially constant angular velocity may be desirable to draw the glass ribbon equally at both sides of the first edge portion 205a of the glass ribbon 205.

As mentioned previously, first pull roll apparatus 301 may also include an optional second downstream pair of draw rolls 331. In such examples, the second downstream pair of draw rolls 331 can include a single motor associated with one of the first or second pull roll members 333a, 333b. In such an example, the control device 251 can operate the single motor such that the associated first or second pull roll members 333a, 333b is rotated with a substantially constant angular velocity. As further described above, each of the first and second pull roll members 333a, 333b may be provided with a corresponding motor 337a, 337b. In such examples, the control device 251 may operate at least one, such as both, of the second downstream pair of draw rolls 331 to rotate with a substantially constant angular velocity. Rotating both pull roll members 333a, 333b of the second downstream pair of draw rolls 331 with a substantially constant angular velocity may be desirable to draw the glass ribbon equally at both sides of the second edge portion 205b of the glass ribbon 205.

Although not required, in some examples, the control device 251 can operate one or both of the motors associated with the first downstream pair of draw rolls 323 with a substantially constant first angular velocity and can simultaneously operate one or both of the motors associated with the second downstream pair of draw rolls 331 to rotate with a substantially constant second angular velocity that is substantially equal to the first angular velocity. Providing substantially equal first and second angular velocities can be desired, for example, to apply draw the glass ribbon equally at the first and second edge portions 205a, 205b.

Figure 4:
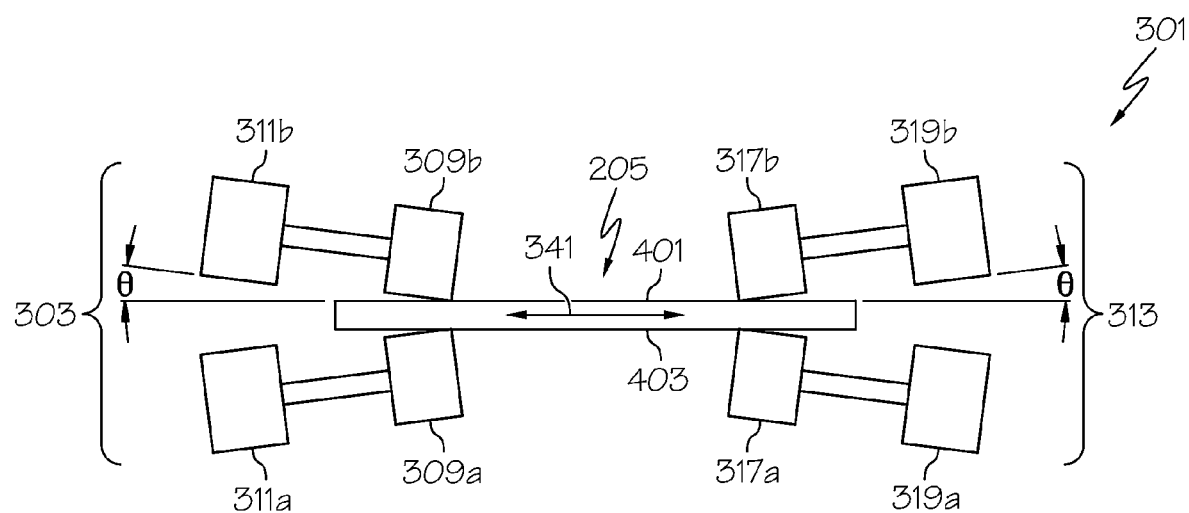
FIG. 4 is an example top view of the first pull roll apparatus of FIG. 3.

In some examples, the pairs of draw rolls discussed throughout the application may have similar constructions and orientations as set forth in U.S. Patent Application Publication No. 2009/0107182 that published on Apr. 30, 2009 to Anderson et al., which is herein incorporated by reference in its entirety. For example, any of the pairs of draw rolls may be vertically downtilted or horizontally level rolls with respect to the glass ribbon. Moreover, As shown in FIG. 4, any of the pairs of rolls (horizontally level or downtilted) may be positioned to have a predetermined horizontal angle θ that a respective face of the rolls would be positioned relative to a respective major surface 401, 403 of the glass ribbon 205. The horizontal angle θ can be desirable to provide an appropriate level of cross-draw tension 341 and/or accommodate a taper effect that may occur during normal roll wear.

FIG. 3 illustrates an example where each of the first and second upstream pair of draw rolls 303, 313 and first and second downstream pair of draw rolls 323, 331 can comprise vertically downtilted rolls with respect to the glass ribbon 205. The downtilt angle of any pair of the draw rolls may be different or the same as any other pair of draw rolls depending on process considerations. Downtilting of the first and/or second upstream pair of draw rolls 303, 313 can provide a desired level of cross-draw tension 341 between the two pairs of draw rolls 303, 313. Likewise, downtilting the first and/or second downstream pair of draw rolls 323, 331 can provide a desired level of cross-draw tension 343 between the two pairs of draw rolls 323, 331.

In some examples, the control device 251 may be configured to activate an automatic positioner (not shown) or a manual mechanism may be used to adjust the downtilt position of the vertically towntilted rolls so as to control (or tune) the average cross-draw tension 341, 343 across the glass ribbon 205.

In further examples, one or more of the pairs of draw rolls may be horizontally level rolls with respect to the glass ribbon. For example, FIG. 7 shows the pull roll device 217 including pairs of draw rolls that may be horizontally level with respect to the glass ribbon wherein the rotation axis extends substantially perpendicular to the draw path 305 of the glass ribbon. Providing one or both of the pairs of rolls of the pull roll device as horizontally level rolls may be desired if cross-wise tension is not necessary across the width of the glass ribbon along the pairs of rolls.

FIGS. 7 and 8 also illustrate another example glass manufacturing apparatus 701 including the pull roll device 217 with a first pull roll apparatus 703 including a first upstream pair of draw rolls 705 including a first pull roll member 707a and a second pull roll member 707b. The first pull roll member 707a can include a first and second refractory roll covering 709a, 709b coupled to a first upper shank 711. Likewise, the second pull roll member 707b can include a first and second refractory roll covering 713a, 713b coupled to a second upper shank 715. The first refractory roll coverings 709a, 713a are configured to engage the first edge portion 205a of the glass ribbon 205 therebetween. Likewise, the second refractory roll coverings 709b, 713b are configured to engage the second edge portion 205b of the glass ribbon 205 therebetween.

At least one of the first and second pull roll members 707a, 707 may be provided with a respective motor 717a, 717b. For example, as shown, both the first and second pull roll members 707a, 707b are provided with a respective motor 717a, 717b. The motor 717a can rotate the first upper shank 711 together with the first and second refractory roll coverings 709a, 709b coupled to the first upper shank 711. Likewise, the motor 717b can rotate the second upper shank 715 together with the first and second refractory roll coverings 713a, 713b coupled to the second upper shank 715. In further examples, only one of the first and second pull roll members 707a, 707b is provided with a motor wherein the other pull roll member may be provided with a bearing such that only one of the first and second pull roll members 707a, 707b is driven.

The pull roll device 217 further includes a second pull roll apparatus 719 including a first downstream pair of draw rolls 721 positioned downstream along the draw path 305 from the first upstream pair of draw rolls 705. The first downstream pair of draw rolls 721 are configured to further draw the first edge portion 205a and the second edge portion 205b of the glass ribbon 205 along the draw path 305. The first downstream pair of draw rolls 721 include a first pull roll member 723a and a second pull roll member 723b. The first pull roll member 723a can include a first and second refractory roll coverings 725a, 725b coupled to a first lower shank 727. Likewise, the second pull roll member 723b can include a first and second refractory roll covering 729a, 729b coupled to a second lower shank 731. The first refractory roll coverings 725a, 729a are configured to engage the first edge portion 205a of the glass ribbon 205 therebetween. Likewise, the second refractory roll coverings 725b, 729b are configured to engage the second edge portion 205b of the glass ribbon 205 therebetween.

At least one of the first and second pull roll members 723a, 723b may be provided with a respective motor 733a, 733b. For example, as shown, both the first and second pull roll members 723a, 723b are provided with a respective motor 733a, 733b. The motor 733a can rotate the first lower shank 727 together with the first and second refractory roll coverings 725a, 725b coupled to the first lower shank 727. Likewise, the motor 733b can rotate the second lower shank 731 together with the first and second refractory roll coverings 729a, 729b coupled to the second lower shank 731. In further examples, only one of the first and second pull roll members 723a, 723b is provided with a motor wherein the other pull roll member may be provided with a bearing such that only one of the first and second pull roll members 723a, 723b is driven.

As shown in FIG. 7, the glass manufacturing apparatus 701 can further include a control device 251 configured to independently operate the first pull roll apparatus 703 and the second pull roll apparatus 719 such that at least one of the first upstream pair of draw rolls 705 rotates with a substantially constant torque and at least one of the first downstream pair of draw rolls 721 rotates with a substantially constant angular velocity. In one example, the control device 251 is configured to operate the first pull roll apparatus 703 such that both of the first upstream pair of draw rolls 705 rotate with a substantially constant torque. In another example, the control device 251 is configured to operate the second pull roll apparatus 719 such that both of the first downstream pair of draw rolls 721 rotate with a substantially constant angular velocity.

Figure 9:
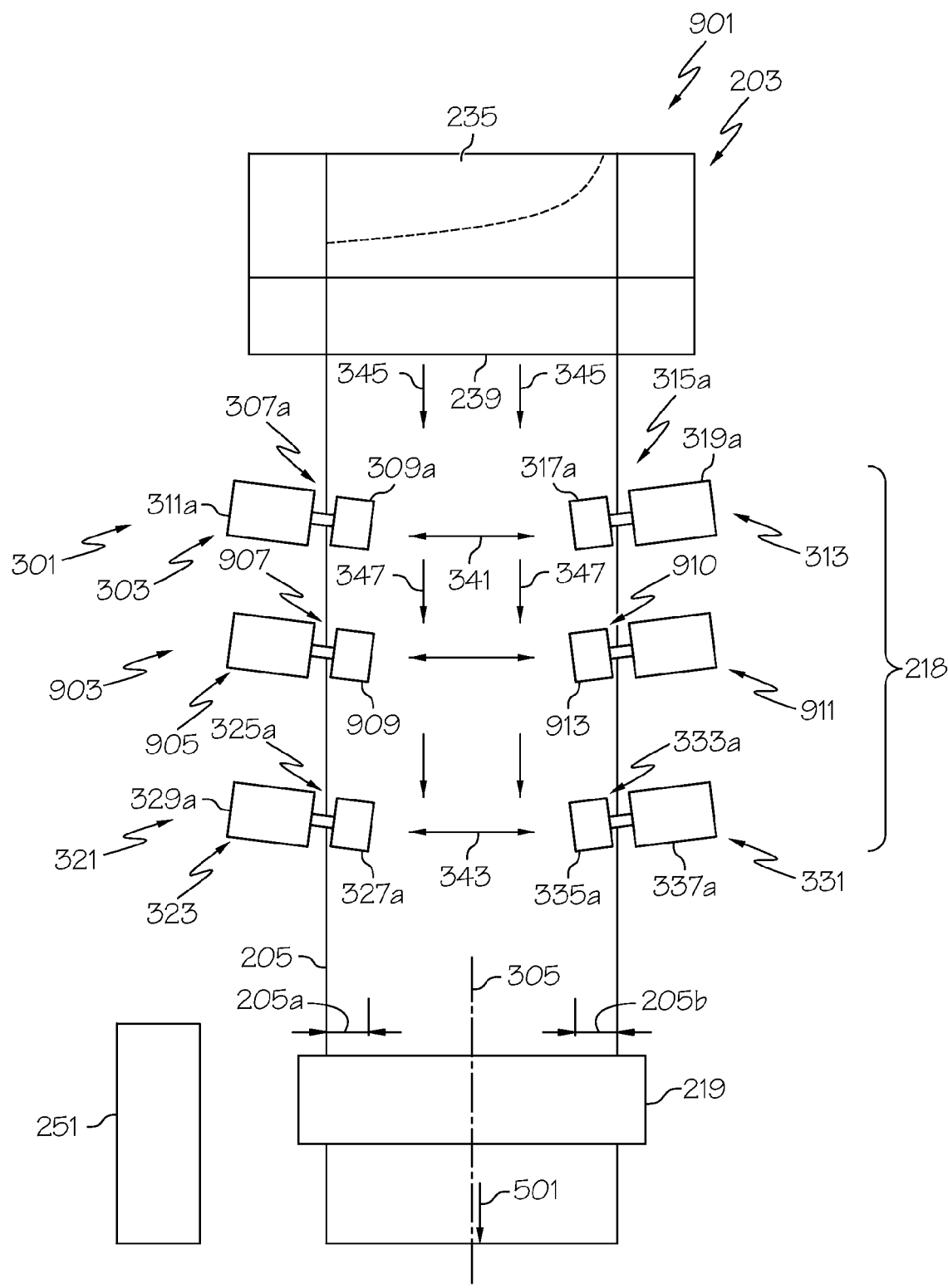
FIG. 9 is a front view of yet another pull roll device in accordance with aspects of the disclosure

FIG. 9 illustrates another example glass manufacturing apparatus 901 including the pull roll device 218 with an intermediate pull roll apparatus 903 that is positioned at an intermediate elevation between the first pull roll apparatus 301 and the second pull roll apparatus 321. A single intermediate pull roll apparatus 903 is illustrated such that a total of three pull roll apparatus (e.g., apparatus 301, 321 and 903) are shown. It will be appreciated that two or more intermediate pull roll apparatus may be provided in further examples such that there are a total of four or more pull roll apparatus in further examples. Providing two pull roll apparatus may be sufficient to distribute support along the edge portions of the glass ribbon in some examples. Providing additional pull roll apparatus may be desired in further examples to help further share the load by driving the edge portions of the ribbon at multiple elevations.

As shown in FIG. 9, the one or more intermediate pull roll apparatus 903 can have similar, such as identical, construction as the first and/or second pull roll apparatus 301, 321. Indeed, the intermediate pull roll apparatus can include a first intermediate pair of draw rolls 905 including a first pull roll member and a second pull roll member 907 (one shown in FIG. 9). The first intermediate pair of draw rolls 905 can include a first and second refractory roll covering 909 (one shown in FIG. 9). Likewise, the intermediate pull roll apparatus 903 can include a second intermediate pair of draw rolls 911 that can include including a first pull roll member and a second pull roll member 910 (one shown in FIG. 9). The second intermediate pair of draw rolls 911 can include a first and second refractory roll covering 913 (one shown in FIG. 9). The first refractory roll coverings 909 are configured to engage the first edge portion 205a of the glass ribbon 205 therebetween. Likewise, the second refractory roll coverings 913 are configured to engage the second edge portion 205b of the glass ribbon 205 therebetween.

Like the other pull roll members described above, at least one of the first or second pull roll members 907, 910 can include a motor configured to rotate the corresponding pull roll members. In some examples, the intermediate pull roll apparatus 903 may be controlled with the control device 251 similar to the first pull roll apparatus 301. In alternative examples, the intermediate pull roll apparatus 903 may be controlled with the control device 251 similar to the second pull roll apparatus 321. For instance, in one example, the intermediate pull roll apparatus is operated under substantially constant torque like the first pull roll apparatus 301. Alternatively, the intermediate pull roll apparatus may be operated under substantially constant velocity like the second pull roll apparatus 321. Moreover, the control device 251 may accommodate for wear of the refractory roll coverings in a manner similar to the first or second pull roll apparatus depending on whether the intermediate pull roll apparatus is operating under a substantially constant angular velocity mode or a substantially constant torque mode.

As described above, each pull roll apparatus includes at least one motor. The motors can comprise servo motors that may optionally be provided with a gear box to drive the respective rolls. The servo motors, if provided, can provide torque and/or angular velocity measurements back to the control device 251 (e.g., programmable logic controller) that may then be used by the control device 251 to implement the desired control scheme. Alternatively, the control device 251 may interact with other types of motor controllers such as variable frequency drives to control the angular velocity and/or torque of the respective motors. In this example, torque sensors and/or angular velocity sensors may be used to sense operating conditions and provide feedback of the sensed conditions to the control device 251.

Methods of manufacturing the glass ribbon 205 will now be described with respect to the pull roll device 215 illustrated in FIGS. 3-6 with the understanding that a similar, such as an identical methods may be carried out to manufacture the glass ribbon 205 with the pull roll device 217 illustrated in FIGS. 7-8 and/or the pull roll device 218 illustrated in FIG. 9.

Referring to FIG. 3 the method can include the steps of providing the first pull roll apparatus 301 including the first upstream pair of draw rolls 303. In another example, the first pull roll apparatus 301 may optionally be provided with a second upstream pair of draw rolls 313.

The method further includes the step of providing the second pull roll apparatus 321 including the first downstream pair of draw rolls 323 positioned downstream along the draw path 305 from the first upstream pair of draw rolls 303. In a further example, the second pull roll apparatus 321 may optionally be provided with a second downstream pair of draw rolls 303 positioned downstream along the draw path 305 from the second upstream pair of draw rolls 313.

The method further includes the step of forming the glass ribbon 205 with the width "W" extending between the first edge portion 205a and the second edge portion 205b. The first pull roll apparatus 301 can be independently operated, for example, with the control device 251 without input from the second pull roll apparatus 321. For instance, the first pull roll apparatus 301 can be independently operated such that at least one of the first upstream pair of draw rolls 303 rotates with a substantially constant torque to draw the first edge portion 205a of the glass ribbon 205 along the draw path 305. In one example, the first pull roll apparatus 301 can be operated such that both of the first upstream pair of draw rolls 303 rotate with a substantially constant torque.

The second upstream pair of draw rolls 313, if provided, can also be independently operated such that at least one of the second upstream pair of draw rolls 313 rotates with a substantially constant torque to draw the second edge portion 205b of the glass ribbon 205 along the draw path 305. In one example, the first pull roll apparatus 301 can be operated such that both of the second upstream pair of draw rolls 313 rotate with a substantially constant torque. As such, a desired tension 345 along the draw path 305 may be maintained in the glass ribbon 205 between the root 239 and the first pull roll apparatus 301.

The method further independently operates the second pull roll apparatus 321 such that at least one of the first downstream pair of draw rolls 323 rotates with a substantially constant angular velocity to further draw the first edge portion 205a of the glass ribbon 205 along the draw path 305. In one example, the method can include the step of operating the second pull roll apparatus 321 such that both of the first downstream pair of draw rolls 323 rotate with a substantially constant angular velocity.

The second downstream pair of draw rolls 331, if provided, can also be independently operated such that at least one of the second downstream pair of draw rolls 331 rotates with a substantially constant angular velocity to further draw the second edge portion 205b of the glass ribbon 205 along the draw path 305. In one example, the method can include the step of operating the second pull roll apparatus 321 such that both of the second downstream pair of draw rolls 331 rotate with a substantially constant angular velocity. As such, a desired tension 347 along the draw path 305 may be maintained in the glass ribbon 205 between the first pull roll apparatus 301 and the second pull roll apparatus 321.

The method can further include the step of sequentially separating a plurality of glass sheets 247 from the glass ribbon 205 over a period of time at a location downstream along the draw path 305 from the first downstream pair of draw rolls 303. For example, as shown in FIG. 2, the separating device 219 may be periodically activated to sequentially separate a plurality of glass sheets 247 as the glass ribbon 205 is drawn from the forming device 203.

Figure 10:
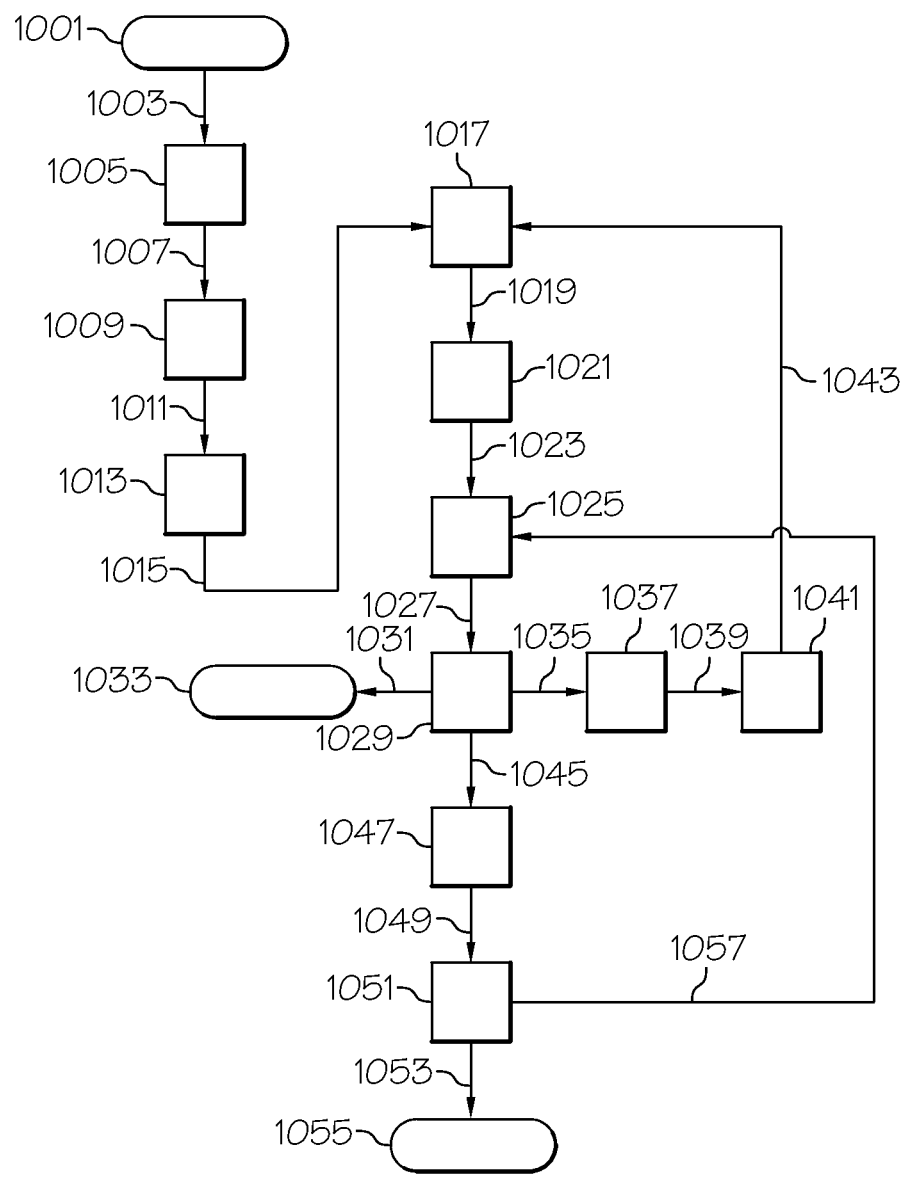
FIG. 10 is a flow diagram illustrating steps in various example methods in accordance with aspects of the present disclosure.

FIG. 10 shows a flow chart illustrating example steps in accordance with example methods of the present disclosure. The methods represented in FIG. 10 can apply to the pull roll device 215 illustrated in FIGS. 3-6, the pull roll device 217 illustrated in FIGS. 7-8 and/or the pull roll device 218 illustrated in FIG. 9, or other pull roll device configurations.

The method can begin with step 1001 and, as indicated by arrow 1003, move to the step 1005 of providing at least the first pull roll apparatus 301 and the second pull roll apparatus 321 as described more fully above. As indicated by arrow 1007, the method can then proceed to step 1009 of forming the glass ribbon 205 with the width W extending between the first edge portion 205a and the second edge portion 205b. As indicated by arrow 1011, the method can then proceed to step 1013 of operating the first pull roll apparatus such that the first and/or second upstream pair of draw rolls 303, 313 rotates to draw the respective first edge portion 205a and/or second edge portion 205b along the draw path 305.

As indicated by arrow 1015, the method then proceeds to step 1017 of calculating a first downstream angular velocity and/or a second downstream angular velocity. As described above, the first downstream angular velocity can be calculated based on the first downstream equation including the predetermined diameter of at least one of the first downstream pair of draw rolls 323 and the predetermined ribbon velocity of the first edge portion of the glass ribbon downstream from the second pull roll apparatus. Likewise, as described above, the second downstream angular velocity can be calculated based on a second downstream equation including the predetermined diameter of at least one of the second downstream pair of draw rolls and the predetermined ribbon velocity of the second edge portion of the glass ribbon downstream from the second pull roll apparatus.

As further shown in FIG. 10, as shown by arrow 1019, the method can then proceed to step 1021 of operating the second pull roll apparatus such that at least one of the first and/or second downstream pair of draw rolls rotates at the respective calculated first and second downstream angular velocities to further draw the respective first and second edge portion of the glass ribbon along the draw path at the predetermined ribbon velocity.

As further shown by arrow 1023, the method can then proceed to the step 1025 of monitoring the actual velocity of the first edge portion and/or the second edge portion downstream from the second pull roll apparatus.

As indicated by arrow 1027, the method can then proceed to the step 1029 of modifying the predetermined diameter of the first and/or second downstream equation based on the monitored actual velocity of the respective first and second edge portion 205a, 205b such that the predetermined ribbon velocity in the first and/or second downstream equation changes to substantially match the monitored actual velocity of the of the first and/or second edge portion of the glass ribbon downstream from the second pull roll apparatus without substantially changing the corresponding first and/or second downstream angular velocity. Although not required, in some examples, the step 1029 of modifying can include ramping the predetermined diameter over a period of time such that the predetermined ribbon velocity approaches the actual corresponding velocity of the first and/or section edge portion of the glass ribbon over time.

As indicated by arrow 1031, in some examples, the method can end as indicated at 1033. In further examples, as indicated by arrow 1035, the method can optionally include the step 1037 of monitoring the thickness of the glass ribbon, for example, by the thickness sensors 259a, 259b. As shown by arrow 1039, the method can then include the step 1041 of changing the predetermined ribbon velocity in the first and/or second downstream equation to maintain the average thickness of the respective edge portion of the glass sheet within a desired range of average thicknesses.

As indicated by arrow 1043, the method can then loop back to the step 1017 of calculating a first downstream angular velocity and/or a second downstream angular velocity with the changed predetermined ribbon velocity.

Turning back to the step 1029 of modifying the predetermined diameter of the first and/or second downstream equation, as indicated by arrow 1045, the method can then alternatively proceed to the step 1047 of monitoring the first and/or second upstream angular velocity associated with the corresponding first and/or second upstream pair of draw rolls 303, 313. As indicated by arrow 1049, the method can then proceed to step 1051 of modifying a predetermined diameter associated with the first and/or second upstream pair of draw rolls 303, 313 based on a first and/or second upstream equation including the monitored first and/or second upstream angular velocity and the corresponding actual velocity of the first and/or second edge portion monitored during step 1025. As indicated by arrow 1053, the method can then end at step 1055. Alternatively, as shown by arrow 1057, the method can loop back to the step 1025 of monitoring.

Figure 11:
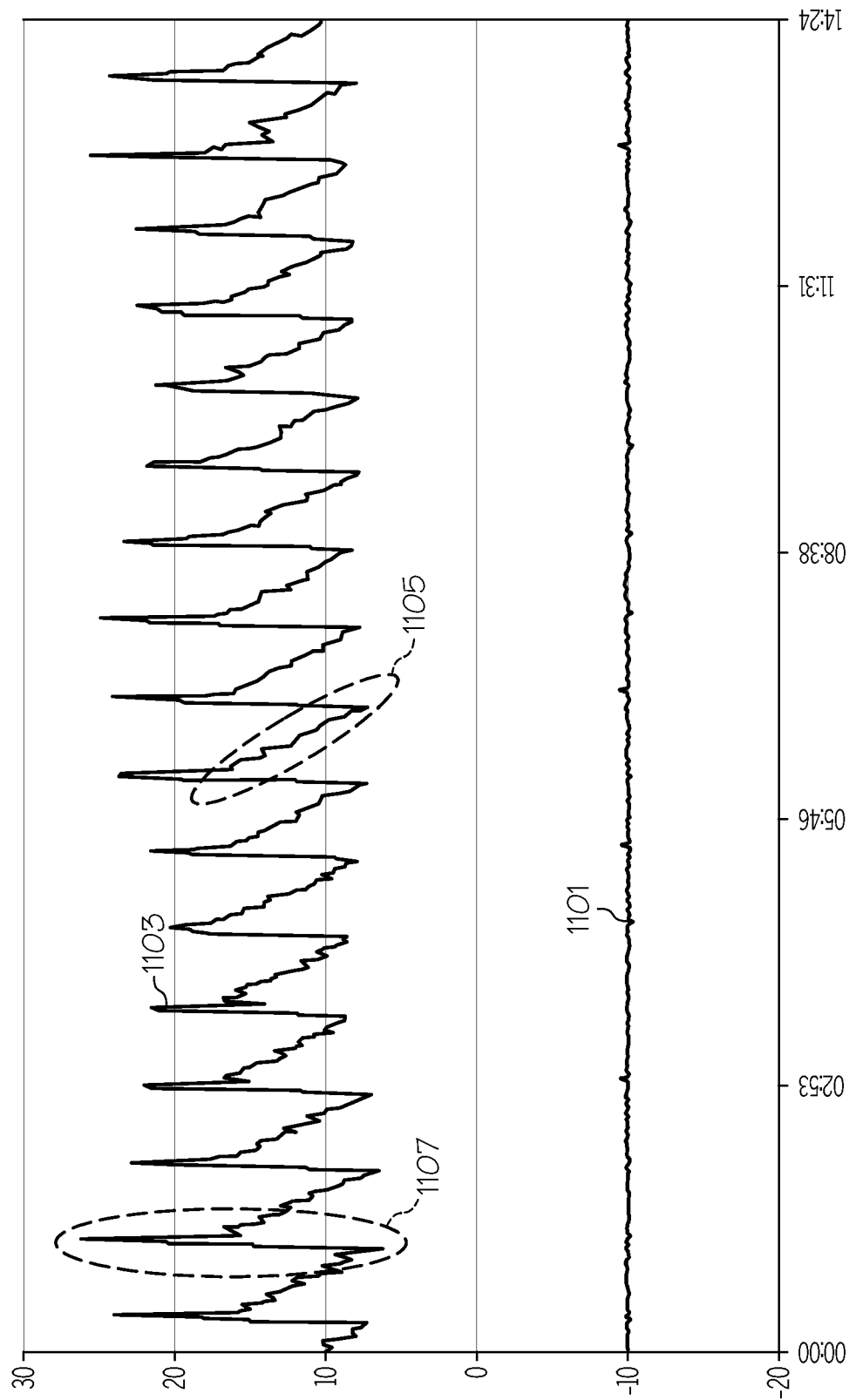
FIG. 11 shows an example graph of the forces applied to the glass ribbon by a first upstream pair of draw rolls and the first downstream pair of draw rolls.

FIG. 11 shows an example graph of the forces applied to the glass ribbon by the first upstream pair of draw rolls 303 and the first downstream pair of draw rolls 323. The Y-axis is force (pounds) and the X-axis is time (minutes:seconds). One plot 1101 represents the force being applied to the glass ribbon 205 by the first upstream pair of draw rolls 303 while the other plot 1103 represents the force being applied to the glass ribbon by the first downstream pair of draw rolls 323. As shown, throughout a period of time, the first upstream pair of draw rolls 303 apply a substantially constant force to the first edge portion 205a of the glass ribbon 205 along the draw path 305 and the first downstream pair of draw rolls 323 apply a varying force to the first edge portion 205a of the glass ribbon 205 along the draw path 305.

Figure 5:
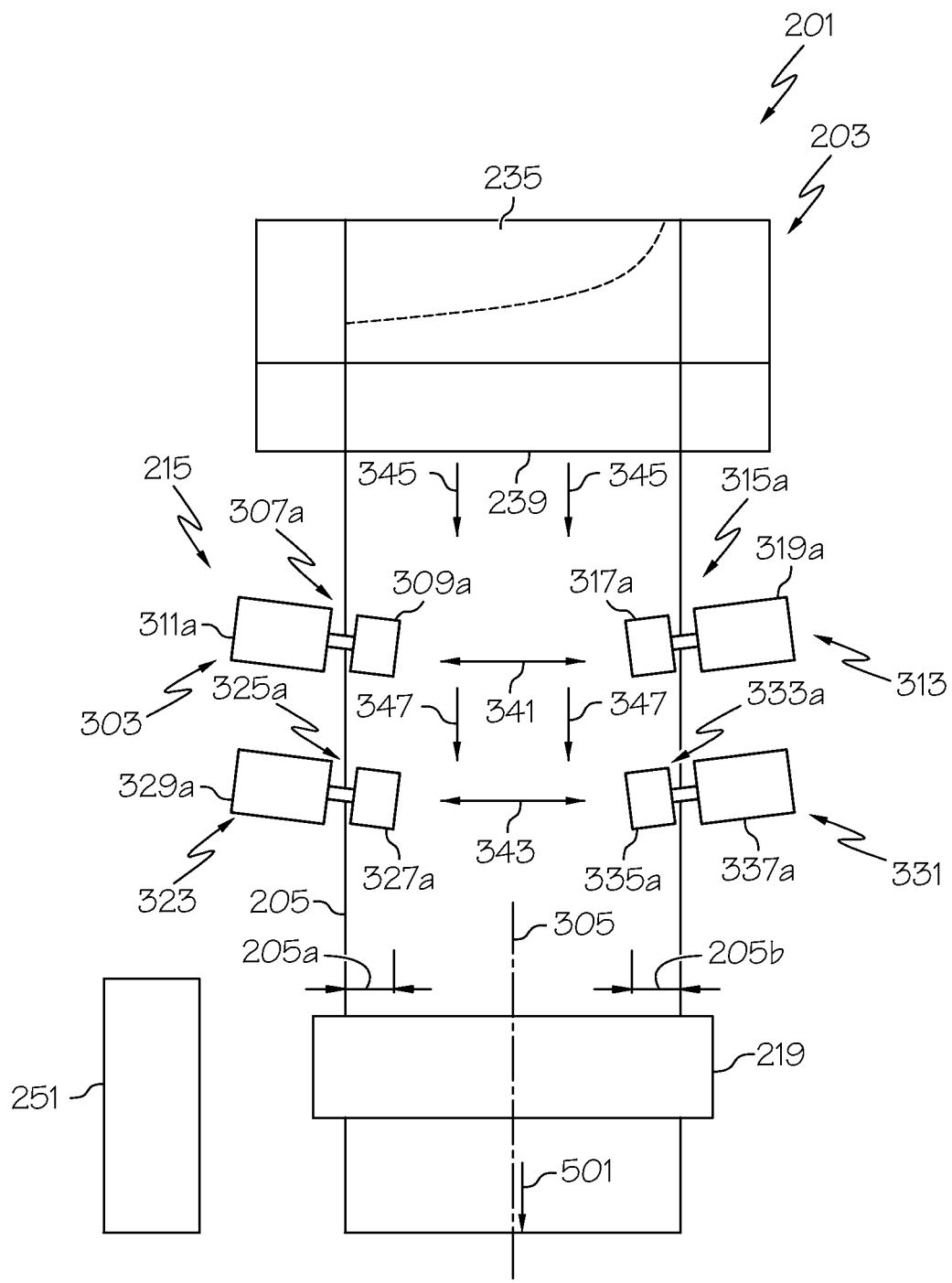
FIG. 5 is a front view of the first example pull roll device illustrated in FIG. 3.
Figure 6:
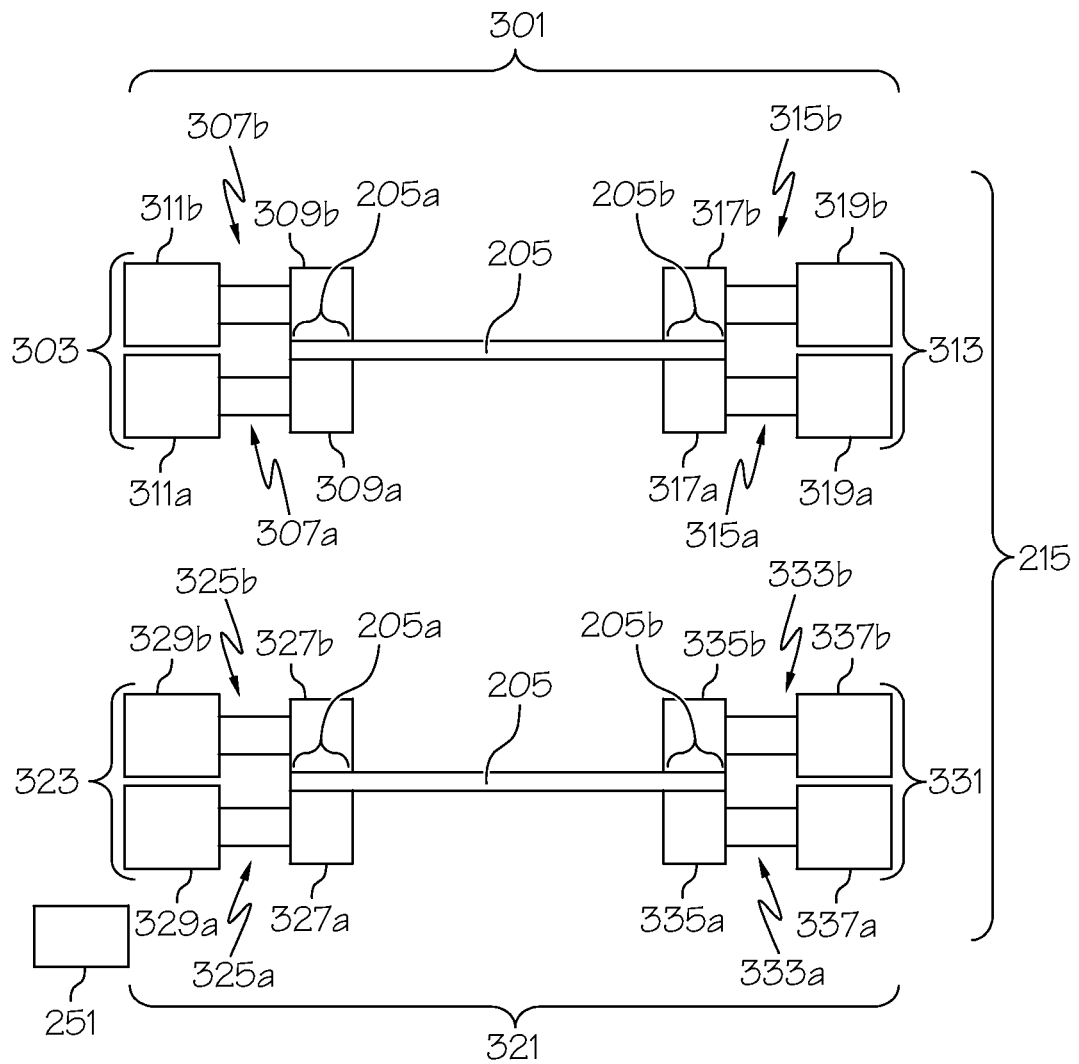
FIG. 6 are top views of the first pull roll apparatus and the second pull roll apparatus of FIGS. 3 and 5.

As shown in FIG. 5, the glass ribbon 205 is drawn in a draw direction 501 along the draw path 305. Turning back to FIG. 11, throughout the period of time, first upstream pair of draw rolls 303 apply a substantially constant force (e.g., 10 pounds) to the first edge portion 205a of the glass ribbon 205 in a direction opposite the draw direction 501. As further illustrated, the first downstream pair of draw rolls 323 apply a varying force (e.g., from about 8 pounds to about 28 pounds) to the first edge portion 205a of the glass ribbon 205 in a direction of the draw direction 501. As such, the first edge portion 205a is constantly maintained in tension between the first upstream pair of draw rolls 303 and the first downstream pair of draw rolls 323 throughout the period of time. In further examples, both forces may act in the positive or negative direction with respect to the draw direction 501 depending on the apparatus set up.

As further shown in FIG. 11, the first downstream pair of draw rolls 323 applies a varying force due to the constant angular velocity associated with the draw rolls 323. The pattern 1105 of the plot 1103 represents the changing force as the glass ribbon 205 increases in length while the pattern 1107 represents the sudden change in force that occurs during separation of a glass sheet from the glass ribbon. During the same period of time, the constant torque of the first upstream pair of draw rolls 303 can maintain a substantially constant force to the glass ribbon. As such, force disturbances can be prevented from being transmitted up the glass ribbon into the setting zone 243 where stress concentrations and corresponding surface defects may be undesirably frozen into the glass ribbon.

As such, methods of the present disclosure can independently operate the first pull roll apparatus 301 over a period of time such that the first upstream pair of draw rolls 303 apply a substantially constant force to the first edge portion 205a of the glass ribbon 205 along the draw path 305. The method can further include the step of independently operating the second pull roll apparatus 321 over the period of time such that at least one of the first downstream pair of draw rolls 323 rotates with a substantially constant angular velocity and the first downstream pair of draw rolls 323 apply a varying force to the first edge portion 205a of the glass ribbon 205 along the draw path 305. The method can further include the step of sequentially separating a plurality of glass sheets 247 from the glass ribbon 205 over the period of time at a location downstream along the draw path 305 from the first downstream pair of draw rolls 303.

As discussed above, the first pull roll apparatus 301 can be provided with a second upstream pair of draw rolls 313. In such examples, the method can further include the step of operating the first pull roll apparatus 301 such that the second upstream pair of draw rolls 313 apply a substantially constant force to the second edge portion 205b of the glass ribbon 205 along the draw path 305. Still further, as mention previously, the second pull roll apparatus 321 can include a second downstream pair of draw rolls 331 positioned downstream along the draw path 305 from the second upstream pair of draw rolls 313. In such examples, the method can further include the step of operating the second pull roll apparatus 321 such that at least one of the second downstream pair of draw rolls 331 rotates with a substantially constant angular velocity and the second downstream pair of draw rolls 303 apply a varying force to the second edge portion 205b of the glass ribbon 205 along the draw path 305.

The pull roll devices 215, 217 can be used to improve the consistency of a cross-draw tension and/or down-draw sheet tension in the glass ribbon which reduces residual stress and improves glass flatness on the manufactured glass ribbon. More specifically, the pull roll devices 215, 217 can be used to control and improve the consistency of the cross-draw tension and/or down-draw sheet tension in the area where the glass ribbon is passing through the setting zone where the product stress and flatness are set in the glass ribbon.

Figure 12:
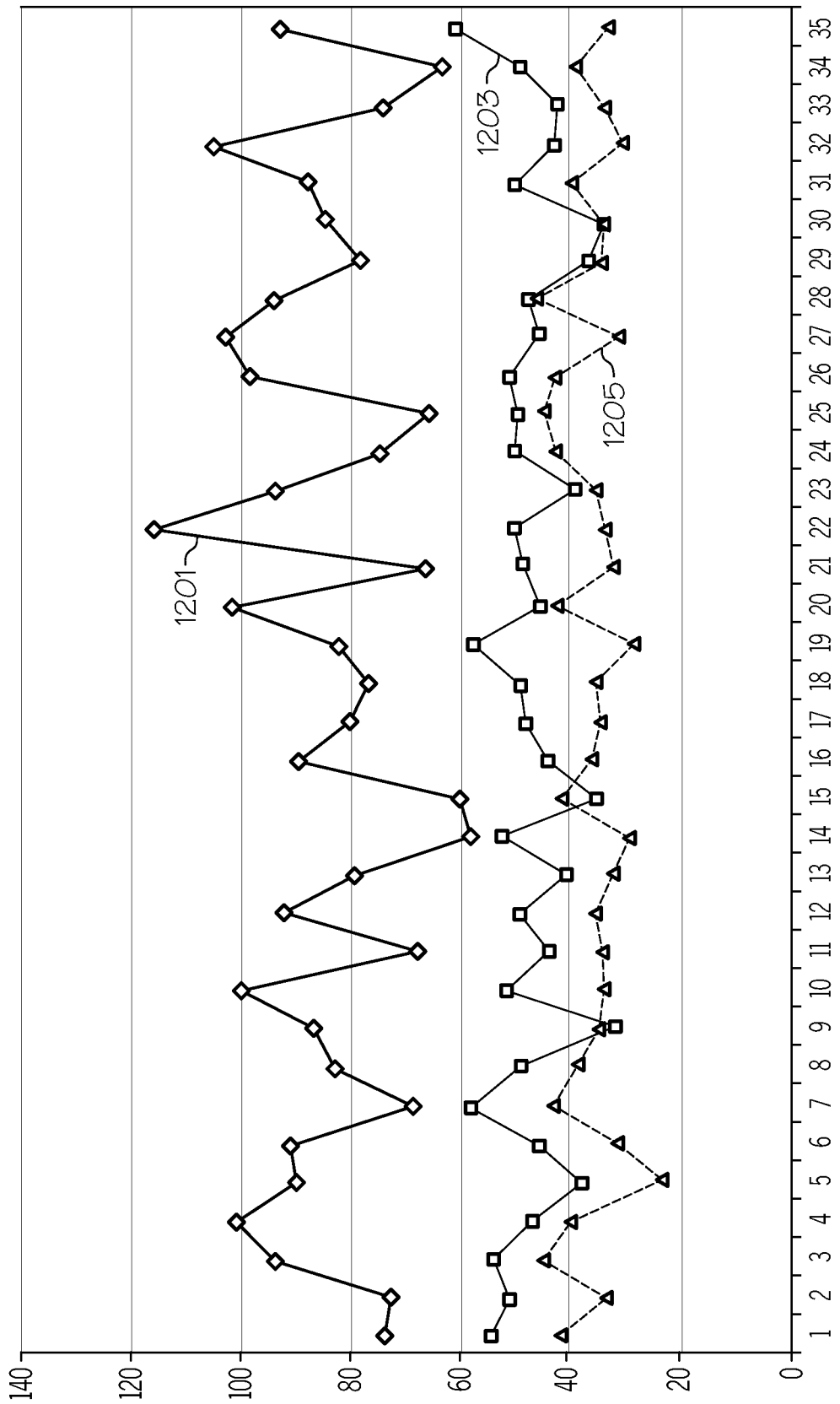
FIG. 12 illustrates a graph of full sheet warp data from sheets made with various control schemes.

FIG. 12 illustrates a graph of full sheet warp data from sheets made with various control schemes. Full sheet warp is a measurement of the deviation of the glass sheet from a plane when the sheet is lying on a flat surface oriented perpendicular to gravity. Maximum deviations from the plane are plotted in FIG. 12 for three sets of sheets made under different conditions. The Y-axis in FIG. 12 represents the maximum deviation in micrometers while the X-axis represents the sheet number. Plot 1201 represents the full sheet warp data of a master/slave configuration wherein the lower pull roll apparatus includes a master motor to rotate lower pair of rolls at a constant angular velocity and the upper pull roll apparatus includes a slave motor configured to rotate an upper pair of rolls at torques that match a predetermined percentage of the measured torque of the master motor of the lower pair of rolls. As shown by plot 1201, the full sheet warp data measures a relatively high maximum deviation in a range of from about 58 microns to about 117 microns.

Plot 1203 in FIG. 12 represents maximum full sheet warp from sheets made using a lower pull roll apparatus and upper pull roll apparatus that are independently operated with a constant angular velocity for both the upper pair of rolls and the lower pair of rolls. As shown by plot 1203, independent constant angular velocity for the upper pair of rolls and the lower pair of rolls results in a reduced maximum deviation in a range of from about 37 microns to about 60 microns.

Plot 1205 in FIG. 12 represents maximum full sheet warp from sheets made using embodiments of the present application where a control device is configured to independently operate the first pull roll apparatus and the second pull roll apparatus such that at least one of the first upstream pair of draw rolls rotates with a substantially constant torque and at least one of the first downstream pair of draw rolls rotates with a substantially constant angular velocity. As shown by plot 1205, such a control configuration surprisingly and significantly reduces the maximum deviation to a range of from about 22 to about 48 microns.

Figure 13:
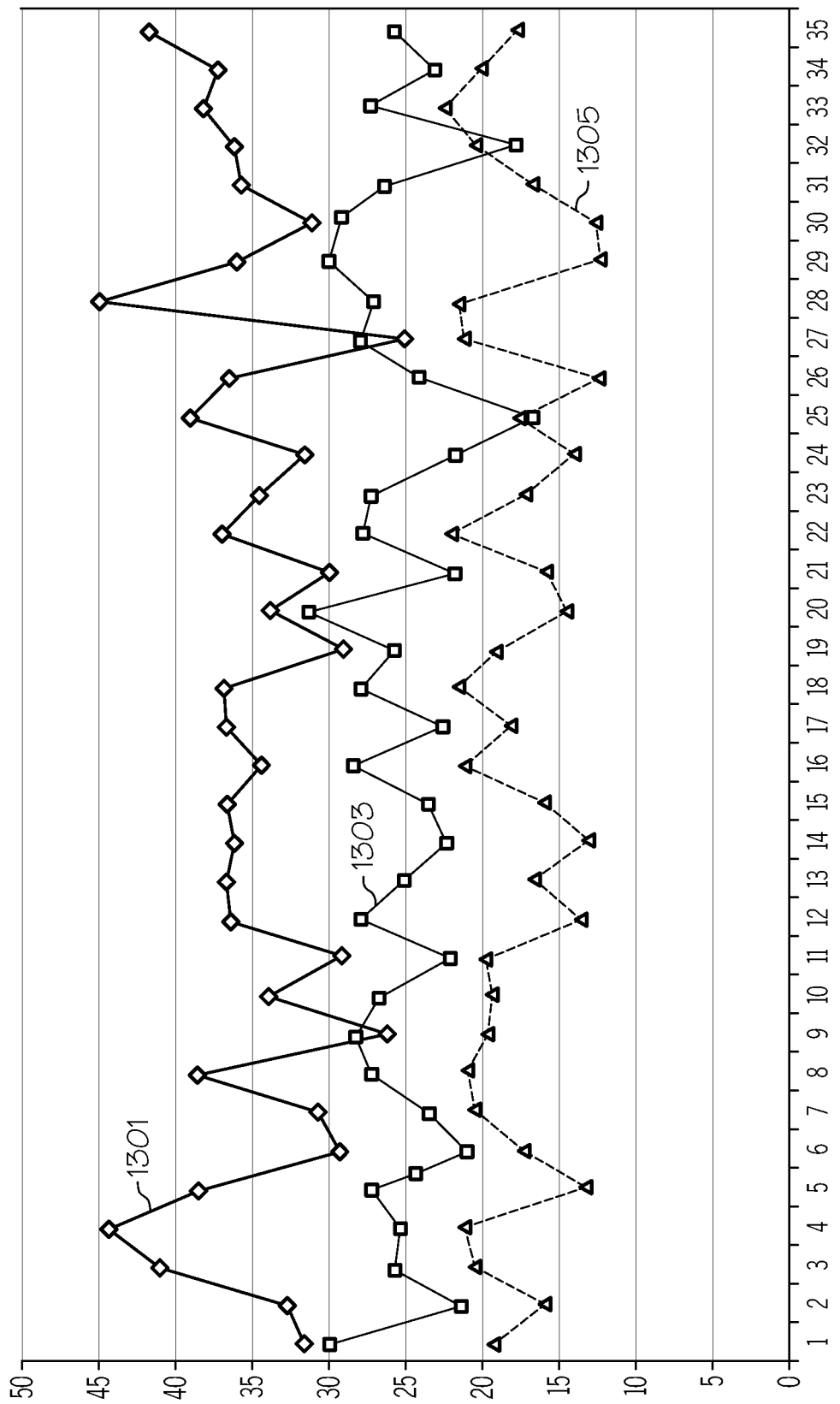
FIG. 13 illustrates another graph of edge gradient data from sheets made with various control schemes.

FIG. 13 illustrates another graph of edge gradient data from sheets made with various control schemes. The edge gradient is calculated from full sheet warp measurements by subtracting the value at a distance 100 mm from the edge from the value at the edge. The difference is a measure of the slope of the glass at the edge of the sheet in the full sheet warp measurement. The Y-axis in FIG. 13 represents the maximum deviation in micrometers/100 mm while the X-axis represents the sheet number. Plot 1301 represents the edge gradient data of a master/slave configuration wherein the lower pull roll apparatus includes a master motor to rotate lower pair of rolls at a constant angular velocity and the upper pull roll apparatus includes a slave motor configured to rotate an upper pair of rolls at torques that match a predetermined percentage of the measured torque of the master motor of the lower pair of rolls. As shown by plot 1301, the edge gradient data measures a relatively high maximum deviation in a range of from about 25 microns/100 mm to about 45 microns/100 mm.

Plot 1303 in FIG. 13 represents the edge gradient data from sheets made using a lower pull roll apparatus and upper pull roll apparatus that are independently operated with a constant angular velocity for both the upper pair of rolls and the lower pair of rolls. As shown by plot 1303, independent constant angular velocity for the upper pair of rolls and the lower pair of rolls results in a reduced maximum edge gradient deviation in a range of from about 17 microns/100 mm to about 30 microns/100 mm.

Plot 1305 in FIG. 13 represents the edge gradient data from sheets made using embodiments of the present application where a control device is configured to independently operate the first pull roll apparatus and the second pull roll apparatus such that at least one of the first upstream pair of draw rolls rotates with a substantially constant torque and at least one of the first downstream pair of draw rolls rotates with a substantially constant angular velocity. As shown by plot 1305, such a control configuration surprisingly and significantly reduces the maximum edge gradient deviation to a range of from about 12 microns/100 mm to about 22 microns/100 mm.

Moreover, providing the operating the upstream pair of draw rolls with a substantially constant torque as set forth by embodiments of the present application and as shown by plots 1205, 1305 provides further advantages over operating the upstream pair of draw rolls with a substantially constant angular velocity (as shown by plots 1203 and 1303). First, a constant angular velocity of the upstream pair of draw rolls may provide different tensions at different diameters in the roll. In contrast, operating the upstream pair of draw rolls at a substantially constant torque allows consistent vertical tension to be achieved over time. Indeed, operating with a substantially constant torque nearly compensates for wear of the roll. Forces change slightly with roll diameter as the roll wears at constant torque, but the effect is very small. Velocity control has a much higher sensitivity to roll diameter. Second, a constant angular velocity of the upstream pair of draw rolls may prove difficult to correlate with the sheet velocity due to the diameter uncertainty of the roll. In contrast, operating the upstream pair of draw rolls with a substantially constant torque removes the need to correlate to obtain the proper angular velocity of the roller. Third, operating the upstream pair of draw rolls with a substantially constant torque can avoid the risk of buckling or crack out that may occur when trying to adjust the velocity of the upstream pair of draw rolls to compensate for roll wear. Fourth, operating the upstream pair of draw rolls with a substantially constant torque can avoid the risk of the rolls skipping if the constant angular velocity is too slow. Fifth, operating the upstream pair of draw rolls can avoid excess pull force variability that may occur due to roll run-out in a constant angular velocity.

It will be apparent to those skilled in the art that various modifications and variations can be made without departing from the spirit and scope of the claimed invention.

What is claimed is:

1. A method of manufacturing a glass ribbon comprising the steps of:
   (I) providing a first pull roll apparatus including a first upstream pair of draw rolls and a second pull roll apparatus including a first downstream pair of draw rolls positioned downstream along a draw path from the first upstream pair of draw rolls;
   (II) forming a glass ribbon with a width extending between a first edge portion and a second edge portion;
   (III) operating the first pull roll apparatus such that at least one of the first upstream pair of draw rolls rotates to draw the first edge portion of the glass ribbon along the draw path;
   (IV) calculating a first downstream angular velocity of the at least one of the first downstream pair of draw rolls based on a first downstream equation including a predetermined diameter of the at least one of the first downstream pair of draw rolls and a predetermined ribbon velocity of the first edge portion of the glass ribbon downstream from the second pull roll apparatus;
   (V) operating the second pull roll apparatus such that the at least one of the first downstream pair of draw rolls rotates at the calculated first downstream angular velocity to further draw the first edge portion of the glass ribbon along the draw path at the predetermined ribbon velocity;
   (VI) monitoring an actual velocity of the first edge portion of the glass ribbon downstream from the second pull roll apparatus; and
   (VII) modifying the predetermined diameter in the first downstream equation based on the monitored actual velocity such that the predetermined ribbon velocity in the first downstream equation changes to substantially match the monitored actual velocity of the first edge portion of the glass ribbon downstream from the second pull roll apparatus without substantially changing the first downstream angular velocity.

2. The method of claim 1, further comprising the step of changing the predetermined ribbon velocity in the first downstream equation to maintain an average thickness of the glass sheet within a desired range of average thicknesses.

3. The method of claim 1, wherein step (VII) includes ramping the predetermined diameter over a period of time such that predetermined ribbon velocity approaches the actual velocity of the first edge portion of the glass ribbon over the period of time.

4. The method of claim 1, further comprising the steps of:
   monitoring a first upstream angular velocity of the at least one of the first upstream pair of draw rolls; and
   modifying a predetermined diameter associated with the at least one of the first upstream pair of draw rolls based on a first upstream equation including the monitored first upstream angular velocity and the actual velocity of the first edge portion monitored during step (VI).

5. The method of claim 1, wherein step (III) includes operating the first pull roll apparatus such that the at least one of the first upstream pair of draw rolls rotates with a substantially constant torque.

6. The method of claim 1, wherein step (V) includes operating the second pull roll apparatus such that the at least one of the first downstream pair of draw rolls rotates with a substantially constant angular velocity.

7. A method of manufacturing a glass ribbon comprising the steps of:
(I) providing a first pull roll apparatus including a first upstream pair of draw rolls and a second upstream pair of draw rolls;
(II) providing a second pull roll apparatus including a first downstream pair of draw rolls positioned downstream along a draw path from the first upstream pair of draw rolls, and a second downstream pair of draw rolls positioned downstream along the draw path from the second upstream pair of draw rolls;
(III) forming a glass ribbon with a width extending between a first edge portion and a second edge portion;
(IV) operating the first pull roll apparatus such that at least one of the first upstream pair of draw rolls rotates to draw the first edge portion of the glass ribbon along the draw path and at least one of the second upstream pair of draw rolls rotates to draw the second edge portion of the glass ribbon along the draw path;
(V) calculating a first downstream angular velocity of at least one of the first downstream pair of draw rolls based on a first downstream equation including a predetermined diameter of the at least one of the first downstream pair of draw rolls and a predetermined ribbon velocity of the first edge portion of the glass ribbon downstream from the second pull roll apparatus;
(VI) calculating a second downstream angular velocity of at least one of the second downstream pair of draw rolls based on a second downstream equation including a predetermined diameter of the at least one of the second downstream pair of draw rolls and a predetermined ribbon velocity of the second edge portion of the glass ribbon downstream from the second pull roll apparatus;
(VII) operating the second pull roll apparatus such that the at least one of the first downstream pair of draw rolls rotates at the calculated first downstream angular velocity to further draw the first edge portion of the glass ribbon along the draw path at the predetermined ribbon velocity of the first edge portion, and the at least one of the second downstream pair of draw rolls rotates at the calculated second downstream angular velocity to further draw the second edge portion of the glass ribbon along the draw path at the predetermined ribbon velocity of the second edge portion;
(VIII) monitoring an actual velocity of the first edge portion of the glass ribbon downstream from the second pull roll apparatus and an actual velocity of the second edge portion of the glass ribbon downstream from the second pull roll apparatus;
(IX) modifying the predetermined diameter in the first downstream equation based on the monitored actual velocity of the first edge portion such that the predetermined ribbon velocity of the first edge portion in the first downstream equation changes to substantially match the actual velocity of the first edge portion monitored during step (VIII) without substantially changing the first downstream angular velocity; and
(X) modifying the predetermined diameter in the second downstream equation based on the monitored actual velocity of the second edge portion such that the predetermined ribbon velocity of the second edge portion in the second downstream equation changes to substantially match the actual velocity of the second edge portion monitored during step (VIII) without substantially changing the second downstream angular velocity.

8. The method of claim 7, further comprising the step of changing the predetermined ribbon velocity of the first edge portion in the first downstream equation and/or the step of changing the predetermined ribbon velocity of the second edge portion in the second downstream equation to maintain an average thickness of the glass sheet within a desired range of average thicknesses.

9. The method of claim 7, wherein step (IX) and/or step (X) includes ramping the predetermined diameter over a period of time such that the predetermined ribbon velocity of the corresponding edge portion approaches the monitored actual velocity of the corresponding edge portion over the period of time.

10. The method of claim 7, further comprising the steps of:
monitoring a first upstream angular velocity of the at least one of the first upstream pair of draw rolls and monitoring a second upstream angular velocity of the at least one of the second upstream pair of draw rolls;
modifying a predetermined diameter associated with the at least one of the first upstream pair of draw rolls based on a first upstream equation including the monitored first upstream angular velocity and the actual velocity of the first edge portion monitored during step (VIII); and
modifying a predetermined diameter associated with the at least one of the second upstream pair of draw rolls based on a second upstream equation including the monitored second upstream angular velocity and the actual velocity of the second edge portion monitored during step (VIII).

11. The method of claim 7, wherein step (IV) includes operating the first pull roll apparatus such that the at least one of the first upstream pair of draw rolls and the at least one of the second upstream pair of draw rolls each rotate with a substantially constant torque.

12. The method of claim 7, wherein step (VII) includes operating the second pull roll apparatus such that the at least one of the first downstream pair of draw rolls and the at least one of the second downstream pair of draw rolls each rotate with a substantially constant angular velocity.

* * * * *